(12) United States Patent
Itoh et al.

(10) Patent No.: US 7,294,395 B2
(45) Date of Patent: Nov. 13, 2007

(54) TRANSPARENT ELECTROCONDUCTIVE LAMINATE

(75) Inventors: Haruhiko Itoh, Hino (JP); Hitoshi Mikoshiba, Hino (JP); Yuji Tamura, Hino (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/474,638

(22) PCT Filed: Sep. 3, 2002

(86) PCT No.: PCT/JP02/08949

§ 371 (c)(1),
(2), (4) Date: Oct. 10, 2003

(87) PCT Pub. No.: WO03/020509

PCT Pub. Date: Mar. 13, 2003

(65) Prior Publication Data

US 2004/0151895 A1    Aug. 5, 2004

(30) Foreign Application Priority Data

| Sep. 3, 2001 | (JP) | ............................. 2001-265779 |
| Sep. 28, 2001 | (JP) | ............................. 2001-301303 |
| Dec. 19, 2001 | (JP) | ............................. 2001-385734 |

(51) Int. Cl.
*B32B 5/16* (2006.01)

(52) U.S. Cl. ...................... 428/327; 428/323; 428/330; 428/331

(58) Field of Classification Search ................ 428/323, 428/327, 330, 331
See application file for complete search history.

(56) References Cited

U.S. PATENT DOCUMENTS 5,925,438 A * 7/1999 Ota et al. .................... 428/141
6,210,858 B1 * 4/2001 Yasuda et al. ............ 430/270.1
6,686,031 B2 * 2/2004 Matsufuji et al. ............ 428/212
6,720,955 B2 * 4/2004 Sugawara et al. .......... 345/173

FOREIGN PATENT DOCUMENTS

JP          03-290237 A       12/1991

(Continued)

OTHER PUBLICATIONS

Supplementary European Search Report mailed on Feb. 16, 2007 (EPO).
Database WPI Week 199207, Derwent Publications Ltd., London (Great Britain); AN 1992-051444 (1991).

*Primary Examiner*—Monique R. Jackson
(74) *Attorney, Agent, or Firm*—Rader, Fishman & Grauer PLLC

(57) ABSTRACT

A transparent electroconductive laminate comprising an organic polymer film having stacked on at least one surface thereof an optical interference layer and a transparent electroconductive layer in this order, the optical interference layer comprising a high refractive-index layer and a low refractive-index layer, with the low refractive-index layer being in contact with the transparent electroconductive layer, and the optical interference layer being composed of a crosslinked polymer, wherein the optical interference layer contains ultrafine particles A comprising a metal oxide and/or a metal fluoride and having a primary diameter of 100 nm or less, and/or at least one of the high refractive-index layer and the low refractive-index layer contains fine particles B having an average primary diameter as large as 1.1 times or more the thickness of the optical interference layer and an average primary diameter of 1.2 μm or less in an amount of 0.5 wt % or less of the crosslinked polymer component. This transparent electroconductive laminate is used as a transparent electrode substrate of a transparent touch panel.

25 Claims, 3 Drawing Sheets

FOREIGN PATENT DOCUMENTS

| | | |
|---|---|---|
| JP | 06-218864 A1 | 8/1994 |
| JP | 06-222352 A1 | 8/1994 |
| JP | 08-192492 A | 7/1996 |
| JP | 2535641 | 7/1996 |
| JP | 08-216327 A1 | 8/1996 |
| JP | 2001-049131 A1 | 2/2001 |
| JP | 2001-164119 A1 | 6/2001 |
| JP | 2002-326301 A1 | 11/2002 |
| JP | 2000-301648 A | 10/2003 |
| WO | WO-00/63924 A1 | 10/2000 |

\* cited by examiner

TRANSPARENT ELECTROCONDUCTIVE LAMINATE

TECHNICAL FIELD OF THE INVENTION

The present invention relates to a transparent electroconductive laminate and a transparent touch panel using the same. More specifically, the present invention relates to a transparent electroconductive laminate comprising an organic polymer film having on one surface thereof an optical interference layer, which is suitable for a touch panel having high reliability in the writing durability, and also relates to a transparent touch panel using the same.

BACKGROUND ART

Recently, mobile information terminals equipped with an information display and a transparent touch panel for inputting information are overspread. A resistive type transparent touch panel predominantly used as the transparent touch panel is constituted such that two transparent electrode substrates, each having formed thereon a transparent electroconductive layer, are disposed with a spacing of about 10 to 100 μm and these two electrodes come into contact only at a portion where an external force is applied and act as a switch to enable, for example, selection of a menu on the display or input of graphics and letters.

The light transmittance of conventional transparent touch panels is not sufficiently high and, therefore, the display disposed under the transparent touch panel is hard to see, in many cases. To solve this problem, attempts have been made to the usibility of the display by forming an optical interference layer between the organic polymer film and the transparent electroconductive layer and thereby improving the transmittance of the transparent electrode substrate. Examples of the method for forming an optical interference layer include a method of forming a low refractive-index layer and a high refractive-index layer by a vacuum deposition process such as vacuum evaporation and sputtering, and a method of forming layers through hydrolysis and condensation polymerization of alkoxysilane, titanium alkoxide or zirconium alkoxide and combining the layers to form an optical interference layer. A transparent electrode substrate having good transmittance may be formed by the former method using a vacuum deposition process. However, this method has a problem in that writing durability required of the transparent touch panel can hardly be ensured. Furthermore, the vacuum deposition process incurs an increased production cost and therefore, this method is not suitable for mass production. The latter method is advantageous in view of cost because a vacuum deposition process is not used and the processing is performed by coating. However, in the case of a transparent electrode substrate using a conventional optical interference layer formed by a coating process and not containing fine particles at all, the layer formed through hydrolysis and condensation polymerization of titanium alkoxide or zirconium alkoxide in the optical interference layer is readily broken in a writing durability test and the reliability as a transparent electroconductive laminate or a transparent touch panel cannot be ensured. Even by using these two processes in combination, the writing durability required of the transparent touch panel can be hardly ensured.

A first object of the present invention is to provide a transparent electroconductive laminate, and a transparent touch panel, where an optical interference layer can be formed advantageously in view of cost, excellent transparency is provided and high reliability can be ensured in the writing durability and the like required of the transparent touch panel.

If the haze of the transparent touch panel increases, the display quality of the display screen decreases. The quality of the display screen may be improved by flattening the transparent electroconductive layer surface and thereby decreasing the haze, however, it is known that when the transparent electroconductive layer surface of a movable electrode substrate (a transparent electrode substrate in the input side) and the transparent electroconductive layer surface of a fixed electrode substrate (a transparent electrode substrate opposing the movable electrode substrate) both are extremely flat, the transparent touch panel produced by combining these movable electrode substrate and fixed electrode substrate causes a malfunction. More specifically, when a certain point A on the transparent touch panel is pressed with a pen until two transparent electroconductive layer surfaces of the movable electrode substrate and the fixed electrode substrate come into contact and then the pen is moved to another point B, there is sometimes seen a phenomenon that two transparent electroconductive layer surfaces of the movable electrode substrate and the fixed electrode substrate are still in the state of contacting with each other at the point A, or a phenomenon that separation of two transparent electroconductive layer surfaces of the movable electrode substrate and the fixed electrode substrate, which are contacted with each other at the point A, takes much time. Such malfunctions of the transparent touch panel are caused by a sticking phenomenon of the transparent electroconductive layer surface of the movable electrode substrate and the transparent electroconductive layer surface of the fixed electrode substrate with each other.

For avoiding malfunctions of the transparent touch panel due to such a sticking phenomenon between two transparent electroconductive layer surfaces of the movable electrode substrate and the fixed electrode substrate, a method of adding fine particles into a cured resin layer and thereby roughening the transparent electroconductive layer surface is known (see, for example, Unexamined Japanese Patent Publication (Kokai) No. 8-216327). In this case, the average primary diameter of the fine particle added in the cured resin layer must be larger than the film thickness of the cured resin layer and therefore, the average primary diameter is usually 2 μm or more. In the case where a transparent touch panel using a transparent electroconductive laminate having a transparent electroconductive layer with the surface thereof being roughened by adding, into a cured resin layer, fine particles having an average primary diameter larger than the film thickness of the cured resin layer is disposed on a high resolution color liquid crystal display, the display screen glares on viewing the liquid crystal display through the transparent touch panel and the display grade decreases. This occurs because the RGB three primary color lights transmitted through the liquid crystal panel are scattered on transmitting through the cured resin layer due to the large average primary diameter of the fine particles in the cured resin layer. By reducing the average primary diameter of the fine particles added in the cured resin layer to be smaller than the film thickness of the cured resin layer, glaring may not occur but the fine particle added is buried in the cured resin layer to give a substantially flat cured resin layer and the transparent touch panel malfunctions due to a sticking phenomenon between two transparent electroconductive layer surfaces of the movable electrode substrate and the fixed electrode substrate. As such, the method of adding fine particles in a cured resin layer constituting the transparent electroconductive laminate and thereby roughening the transparent electroconductive layer surface has a problem that, when observed through the transparent touch panel, the display of the high resolution color liquid crystal display is deteriorated.

A second object of the present invention is to provide a transparent electroconductive laminate ensuring excellent display grade of a liquid crystal display on observing the liquid crystal display through a transparent touch panel in the state that the transparent touch panel is disposed on a high resolution color liquid crystal display.

DISCLOSURE OF THE INVENTION (1) A transparent electroconductive laminate comprising an organic polymer film having stacked thereon a transparent electroconductive layer, wherein:

an optical interference layer and a transparent electroconductive layer are sequentially stacked on at least one surface of the organic polymer film, the optical interference layer comprises a high refractive-index layer and a low refractive-index layer, with the low refractive-index layer being in contact with the transparent electroconductive layer, and the high refractive-index layer and the low refractive-index layer are each composed of a crosslinked polymer, at least one of the high refractive-index layer and the low refractive-index layer containing a metal oxide and/or metal fluoride ultrafine particle having a primary diameter of 100 nm or less.

(2) The transparent electroconductive laminate as described in (1) above, wherein the metal oxide and/or metal fluoride is at least one member selected from the group consisting of $Al_2O_3$, $Bi_2O_3$, $CeO_2$, $In_2O_3$, $In_2O_3.SnO_2$, $HfO_2$, $La_2O_3$, $MgF_2$, $Sb_2O_5$, $Sb_2O_5.SnO_2$, $SiO_2$, $SnO_2$, $TiO_2$, $Y_2O_3$, ZnO and $ZrO_2$.

(3) The transparent electroconductive laminate as described in (1) and (2) above, wherein the crosslinked polymer of at least one of the high refractive-index layer and the low refractive-index layer is one formed by hydrolysis and condensation polymerization of a metal alkoxide.

(4) The transparent electroconductive laminate as described in (3) above, wherein the weight ratio of the ultrafine particle to the metal alkoxide is from 5:95 to 80:20.

(5) The transparent electroconductive laminate as described in (4) above, wherein the high refractive-index layer is one formed by hydrolysis and condensation polymerization of a mixture comprising the ultrafine particle and alkoxysilane at a weight ratio of 5:95 to 80:20.

(6) The transparent electroconductive laminate as described in (3) above, wherein the high refractive-index layer is one formed by hydrolysis and condensation polymerization of a mixture comprising the ultrafine particle and a metal alkoxide at a weight ratio of 1:99 to 60:40 and the metal alkoxide is mainly comprised of a metal alkoxide other than alkoxysilane.

(7) The transparent electroconductive laminate as described in (1) above, wherein the high refractive-index layer is composed of a mixture comprising the ultrafine particle and the thermosetting resin or radiation-curable resin at a weight ratio of 5:95 to 80:20.

(8) The transparent electroconductive laminate as described in (1) and (2) above, wherein the crosslinked polymer of at least one of the high refractive-index layer and the low refractive-index layer is a thermosetting resin or a radiation-curable resin.

(9) The transparent electroconductive laminate as described in (1) to (8) above, wherein the difference in the refractive index between the high refractive-index layer and the low refractive-index layer is 0.2 or more.

(10) The transparent electroconductive laminate as described in (1) to (9) above, wherein at least one of the high refractive-index layer and the low refractive-index layer contains a second fine particle having an average primary diameter as large as 1.1 times or more the thickness of the optical interference layer and an average primary diameter of 1.2 μm or less, and the content of the second fine particle is 0.5 wt % or less of the crosslinked polymer component constituting the high refractive-index layer and/or low refractive-index layer containing the second fine particle.

(11) The transparent electroconductive laminate as described in (1) to (10) above, which comprises a cured resin layer between the organic polymer film and the optical interference layer.

(12) The transparent electroconductive laminate as described in (1) to (11) above, wherein the cured resin layer is composed of a thermosetting or radiation-curable resin and has a thickness of 2 to 5 μm.

(13) The transparent electroconductive laminate as described in (11) and (12) above, wherein the cured resin layer contains a third fine particle.

(14) The transparent electroconductive laminate as described in (1) above, wherein the high refractive-index layer is one formed by hydrolysis and condensation polymerization of a mixture comprising the ultrafine particle and a metal alkoxide, the metal alkoxide is mainly comprised of a metal alkoxide other than alkoxysilane, the low refractive-index layer is one formed by hydrolysis and condensation polymerization of alkoxysilane, the ultrafine particle is $TiO_2$, and the third fine particle is a silica particle.

(15) The transparent electroconductive laminate as described in (1) to (14) above, wherein a transparent substrate is stacked on the surface of the organic polymer film opposite the optical interference layer, through a transparent elastic layer having a Young's modulus smaller than that of the organic polymer film.

(16) A transparent electroconductive laminate comprising an organic polymer film having stacked thereon a transparent electroconductive layer, wherein an optical interference layer and a transparent electroconductive layer are sequentially stacked on at least one surface of the organic polymer film, the optical interference layer comprises a high refractive-index layer and a low refractive-index layer, with the low refractive-index layer being in contact with the transparent electroconductive layer, the optical interference layer is composed of a crosslinked polymer, at least one of the high refractive-index layer and the low refractive-index layer contains a fine particle B having an average primary diameter as large as 1.1 times or more the thickness of the optical interference layer and an average primary diameter of 1.2 μm or less, and the content of the fine particle B is 0.5 wt % or less of the crosslinked polymer constituting the high refractive-index layer and/or low refractive-index layer containing the fine particle B.

(17) The transparent electroconductive laminate as described in (16) above, wherein the crosslinked polymer is a polymer formed by hydrolysis and condensation polymerization of a metal alkoxide or is a thermosetting or radiation-curable resin.

(18) The transparent electroconductive laminate as described in (16) and (17) above, wherein at least one of the high refractive index layer and the low refractive-index layer contains an ultrafine particle A having an average primary diameter of 100 nm or less at a weight ratio (ultrafine particle A):(crosslinked polymer) of 0:100 to 80:20.

(19) The transparent electroconductive laminate as described in (18) above, wherein the high refractive-index layer is composed of a mixture comprising the ultrafine particle A and the thermosetting or radiation-curable resin at a weight ratio of 5:95 to 80:20.

(20) The transparent electroconductive laminate as described in (16) to (19) above, which comprises a cured resin layer between the organic polymer film and the optical interference layer.

(21) The transparent electroconductive laminate as described in (20) above, wherein the cured resin layer is composed of a thermosetting or radiation-curable resin and has a thickness of 2 to 5 μm.

(22) The transparent electroconductive laminate as described in (20) and (21) above, wherein the cured resin layer does not contain a fine particle larger than the thickness of the cured resin layer.

(23) The transparent electroconductive laminate as described in (16) above, wherein the high refractive-index layer is one formed by hydrolysis and condensation polymerization of a mixture comprising the fine particle B and a metal alkoxide, the metal alkoxide is mainly comprised of a metal alkoxide other than alkoxysilane, the low refractive-index layer is one formed by hydrolysis and condensation polymerization of alkoxysilane, and the fine particle B is silica.

(24) The transparent electroconductive laminate as described in (16) to (23) above, wherein a transparent substrate is stacked on the surface of the organic film layer opposite the optical interference layer, through a transparent elastic layer having a Young's modulus smaller than that of the organic polymer film.

(25) A transparent touch panel comprising two transparent electrode substrates each having on at least one surface thereof a transparent electroconductive layer, the two transparent electrode substrates being disposed such that the transparent electroconductive layers face each other, wherein at least one transparent electrode substrate is the transparent electroconductive laminate described in (1) to (24) above.

(26) The transparent touch panel as described in (25) above, wherein a movable electrode substrate and a fixed electrode substrate are both a transparent electroconductive laminate.

MODE FOR CARRYING OUT THE INVENTION

The transparent electroconductive laminate of the present invention is obtained by stacking an optical interference layer and a transparent electroconductive layer in this order on at least one surface of an organic polymer film.

Figure 1A:
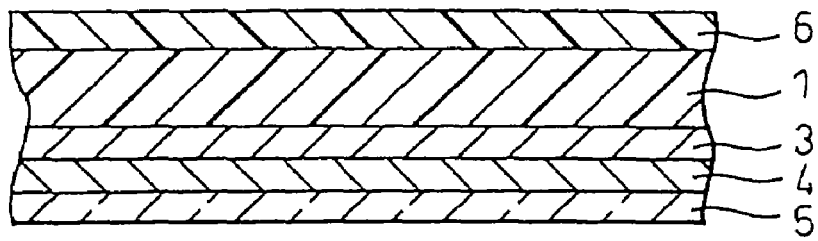
FIGS. 1A and 1B each is a view showing a constitution example of the transparent electroconductive laminate of the present invention.
Figure 1B:
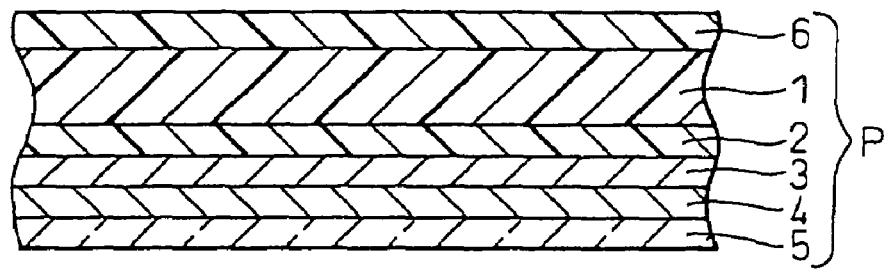

FIGS. 1A and 1B each shows a constitution example of the transparent electroconductive laminate of the present invention. In FIGS. 1A and 1B, a cured resin layer 2 (only in FIG. 1B), a high refractive-index layer 3, a low refractive-index layer 4 (these high and low refractive-index layers work out to an optical interference layer) and a transparent electroconductive layer 5 are formed in this order on one surface of an organic polymer film 1, and a cured resin layer 6 is formed on another surface of the organic polymer film 1.

In the transparent electroconductive laminate of the present invention, the cured resin layer 2 is not essential (FIG. 1A) but is preferably formed (FIG. 1B).

The transparent electroconductive laminate of the present invention is characterized by adding a specific fine particle having a specific diameter preferably in a specific amount to the optical interference layer for the purpose of adjusting the refractive index or roughening the surface.

(1) Optical Interference Layer

The optical interference layer of the present invention comprises a high refractive-index layer and a low refractive-index layer and the low refractive layer is in contact with the transparent electroconductive layer. The high refractive-index layer and the low refractive-index layer each is composed of a crosslinked polymer and at least one of these layers contains a fine particle as described above.

As the crosslinked polymer for use in the present invention, a crosslinked polymer obtained by the hydrolysis and condensation polymerization of a metal alkoxide, or a crosslinked polymer of a thermosetting resin or a radiation-curable resin can be used.

(1a) Crosslinked Polymer Obtained by Hydrolysis and Condensation Polymerization of Metal Alkoxide Among the crosslinked polymers obtained by the hydrolysis and condensation polymerization of a metal alkoxide, crosslinked polymers obtained by the hydrolysis and condensation polymerization of titanium alkoxide, zirconium alkoxide or alkoxysilane are preferred because these polymers ensure excellent properties in, for example, mechanical strength, stability, and adhesion to a transparent electroconductive layer, a substrate or the like.

Examples of the titanium alkoxide include titanium tetraisopropoxide, tetra-n-propyl orthotitanate, titanium tetra-n-butoxide and tetrakis(2-ethylhexyloxy) titanate. Examples of the zirconium alkoxide include zirconium tetraisopropoxide and zirconium tetra-n-butoxide.

Examples of the alkoxysilane include tetramethoxysilane, tetraethoxysilane, methyltrimethoxysilane, methyltriethoxysilane, dimethyldimethoxysilane, γ-glycidoxypropyltrimethoxysilane, β-(3,4-epoxycyclohexyl)ethyltrimethoxysilane, vinyltrimethoxysilane, N-β(aminoethyl)$_y$-aminopropyltrimethoxysilane, N-β(aminoethyl)γ-aminopropylmethyldimethoxysilane and γ-aminopropyltriethoxysilane. In many cases, these silicon alkoxides are preferably used by mixing two or more thereof as needed in view of mechanical strength or adhesion of the layer, solvent resistance and the like. Particularly, a silicon alkoxide having an amino group within the molecule is preferably contained at a weight ratio of 0.5 to 60%, more preferably from 0.5 to 40%, in the entire silicon alkoxide composition.

The metal alkoxide may be used as a monomer or after previously forming it into an appropriate oligomer by the hydrolysis and condensation polymerization but, usually, a coating solution resulting from dissolution and dilution in an appropriate organic solvent is coated on a lower layer. In the coating film formed on the lower layer, hydrolysis proceeds due to moisture in the air and subsequently dehydration condensation polymerization proceeds. An appropriate heating treatment is generally necessary for accelerating the condensation polymerization and in a process of the coating method, a heat treatment at a temperature of 100° C. or more is preferably applied for a few minutes or more. Depending on the case, active rays such as ultraviolet light may be irradiated on the coating film simultaneously with the above-described heat treatment so as to increase the crosslinking degree.

The diluting solvent is suitably an alcohol-base or hydrocarbon-base solvent such as ethanol, 2-propanol, butanol, 2-methyl-1-propanol, 1-methoxy-2-propanol, hexane, cyclohexane and ligroin. Other than these, a polar solvent such as xylene, toluene, cyclohexanone, methyl isobutyl ketone and isobutyl acetate can be also used. These solvents can be used individually or as a mixed solvent of two or more thereof.

(1b) Radiation-Curable Resin and Thermosetting Resin

Examples of the crosslinked polymer for use in the present invention include a polyfunctional polyacrylate-base radiation-curable resin starting from polyol acrylate, polyester acrylate, urethane acrylate, epoxy acrylate or the like, and a thermosetting resin such as melamine-base thermosetting resin starting from etherified methylolmelamine or the like, phenoxy-base thermosetting resin and epoxy-base thermosetting resin. Among these, a polyfunctional polyacrylate-base radiation-curable resin is preferred.

The radiation-curable resin means a resin where polymerization proceeds by the irradiation of a radiation such as ultraviolet light or an electron beam. Examples thereof include an acryl-base resin containing, in the resin composition, a polyfunctional acrylate component having two or more acryloyl groups within the unit structure.

Specific examples of the starting material of giving this acryl-base resin, which is preferably used, include various acrylate monomers such as trimethylolpropane triacrylate, trimethylolpropane ethylene oxide-modified triacrylate, trimethylolpropane propylene oxide-modified triacrylate, isocyanuric acid ethylene oxide-modified triacrylate, pentaerythritol tetraacrylate, dipentaerythritol pentaacrylate, dipentaerythritol hexaacrylate and dimethyloltricyclodecane diacrylate, and polyfunctional acrylate oligomers of polyester-modified acrylate, urethane-modified acrylate or epoxy-modified acrylate. These resins may be used as a single composition or a mixed composition of several kinds. Depending on the case, it is also preferred to add an appropriate amount of a hydrolysis condensate of various silicon alkoxides to the composition.

In the case of performing the polymerization of the resin layer by the irradiation with ultraviolet light, a known photoinitiator is added in an appropriate amount. Examples of the photoreaction initiator include acetophenone-base compounds such as diethoxyacetophenone, 2-methyl-1-{4-(methylthio)phenyl}-2-morpholinopropane, 2-hydroxy-2-methyl-1-phenylpropan-1-one and 1-hyroxycyclohexyl phenyl ketone; benzoin-base compounds such as benzoin and benzyldimethyl ketal; benzophenone-base compounds such as benzophenone and benzoylbenzoic acid; and thioxanthone-base compounds such as thioxanthone and 2,4-dichlorothioxanthone.

Examples of the phenoxy-base thermosetting resin include a resin obtained by thermally crosslinking a phenoxy resin, a phenoxy ether resin or a phenoxy ester resin represented by the following formula (1), with a polyfunctional isocyanate compound.

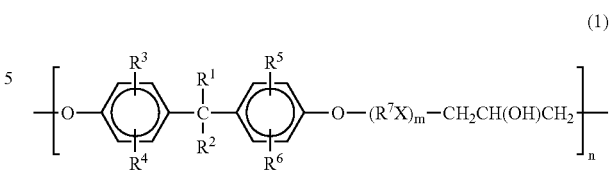

wherein $R^1$ to $R^6$ may be the same or different and each represents hydrogen or an alkyl group having from 1 to 3 carbons, $R^7$ represents an alkylene group having from 2 to 5 carbons, X represents an ether group or an ester group, m represents an integer of 0 to 3, and n represents an integer of 20 to 300. Among these resins, those where $R^1$ and $R^2$ are a methyl group, $R^3$ to $R^6$ are hydrogen and $R^7$ is a pentylene group are preferred in view of productivity because the synthesis is easy.

The polyfunctional isocyanate compound is sufficient if it is a compound having two or more isocyanate groups within one molecule, and examples thereof include polyisocyanates such as 2,6-tolylene diisocyanate, 2,4-tolylene diisocyanate, tolylene diisocyanate-trimethylol propane adduct, tert-cyclohexane-1,4-diisocyanate, m-phenylene diisocyanate, p-phenylene diisocyanate, hexamethylene diisocyanate, 1,3,6-hexamethylene triisocyanate, isophorone diisocyanate, 1,5-naphthalene diisocyanate, tolidine diisocyanate, xylylene diisocyanate, hydrogenated xylylene diisocyanate, diphenylmethane-4,4'-diisocyanate, hydrogenated diphenylmethane-4,4'-diisocyanate, lysine diisocyanate, lysine ester triisocyanate, triphenylmethane triisocyanate, tris(isocyanatophenyl)thiophosphate, m-tetramethylxylylene diisocyanate, p-tetramethylxylylene diisocyanate, 1,6,11-undecane triisocyanate, 1,8-diisocyanate-4-isocyanate methyloctane, bicycloheptane triisocyanate, 2,2,4-trimethylhexamethylene diisocyanate and 2,4,4-trimethylhexamethylene diisocyanate, and a mixture or a polyhydric alcohol adduct thereof. Among these, 2,6-tolylene diisocyanate, 2,4-tolylene diisocyanate, tolylene diisocyanate-trimethylol propane adduct and hexamethylene diisocyanate are preferred in view of general-purpose use and reactivity.

In addition, a known tertiary amine such as triethylene diamine, or an organic tin compound such as dibutyltin dilaurate, may be added as a reaction accelerator to improve the crosslinking rate.

As the epoxy-base thermosetting resin, various types can be used but among those, a resin obtained by thermally crosslinking a novolak epoxy resin represented by the following formula (2), is preferred.

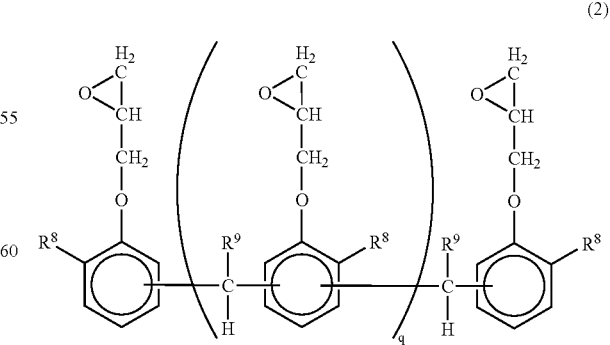

wherein $R^8$ represents hydrogen or a methyl group, $R^9$ represents hydrogen or a glycidyl phenyl ether group, and q represents an integer of 1 to 50. In practice, the value of q generally has a distribution and is difficult to specify but as the average number, the value is preferably larger and q is preferably 3 or more, more preferably 5 or more.

For crosslinking the epoxy resin, a known curing agent is used. Examples of the curing agent include amine-base polyaminoamide types, acids, acid anhydrides, imidazoles, mercaptanes and phenolic resins. Among these, acid anhydrides and alicyclic amines are preferred, and acid anhydrides are more preferred. Examples of the acid anhydride include alicyclic acid anhydrides such as methylhexahydrophthalic anhydride and methyltetrahydrophthalic anhydride, aromatic acid anhydrides such as phthalic anhydride, and aliphatic acid anhydrides such as dodecenylphthalic anhydride. Among these, methylhexahydrophthalic anhydride is preferred. Examples of the alicyclic amine include bis(4-amino-3-methyldicyclohexyl)methane, diaminocyclohexylmethane and isophoronediamine. Among these, bis(4-amino-3-methyldicyclohexyl)methane is preferred.

In the case of using an acid anhydride as the curing agent, a reaction accelerator for accelerating the curing reaction between the epoxy resin and the acid anhydride may be added. Examples of the reaction accelerator include curing catalysts such as known secondary or tertiary amines (e.g., benzylmethylamine, 2,4,6-tris(dimethylaminomethyl)phenol, pyridine, 1,8-diazabicyclo(5,4,0)undecene-1) and imidazoles.

In practical coating of the crosslinked polymer, the above-described compound and various additives (e.g., curing agent, catalyst) are dissolved in an organic solvent of various types and after adjusting the concentration or viscosity, the obtained coating solution is coated on a lower layer. Thereafter, the layer is cured by irradiating a radiation or applying a heat treatment. Examples of the coating method include various coating methods such as microgravure coating method, Mayer bar coating method, direct gravure coating method, reverse roll coating method, curtain coating method, spray coating method, comma coating method, die coating method, knife coating method and spin coating method.

(1c) Ultrafine Particle A (for Adjusting Refractive Index)

In general, the layer formed by the hydrolysis and condensation polymerization of a metal alkoxide, and the crosslinked polymer of a thermosetting resin or a radiation-curable resin are known to exhibit good adhesion to various coating layers. However, if the optical interference layer is formed by stacking only the crosslinked polymer layers, the optical interference layer does not function due to the small difference in the refractive index and a transparent electroconductive laminate having high transmittance cannot be formed, though the adhesion to each layer of the cured resin layer and the transparent electroconductive layer is preferably improved and thereby the writing durability may be improved.

To solve this problem, in the present invention, a specific transparent fine particle having a specific diameter (hereinafter sometimes referred to as a fine particle A) is incorporated into the crosslinked polymer layer preferably in a specific amount so as to generate a difference in the refractive index between respective layers constituting the optical interference layer. By incorporating a specific transparent fine particle into the optical interference layer composed of a crosslinked polymer, the adhesion between respective layers and the writing durability can be improved while imparting a desired refractive index to the optical interference layer. If the fine particle is merely added, there may arise a problem that the formed layer becomes white. In the present invention, a metal oxide and/or metal fluoride fine particle is used for generating a difference in the refractive index between respective layers constituting the optical interference layer while ensuring good adhesion of the optical interference layer, and the diameter of the fine particle and preferably further the blending ratio are controlled, whereby a good optical interference layer can be formed without causing whitening of the film. By this formation of the optical interference layer, the present invention has been accomplished.

The refractive index of the optical interference layer can be adjusted as such by adding an ultrafine particle without causing whitening of the film and, as a result, excellent adhesion to the adjacent layer and a large difference in the refractive index can be realized in the combination of a high refractive-index layer and a low refractive-index layer and thereby, a transparent electroconductive laminate having excellent writing durability and a high transmittance can be formed.

A first aspect of the present invention has been accomplished based on this finding.

In the optical interference layer according to the first aspect of the present invention, the refractive index of each layer constituting the optical interference layer is adjusted by adding a specific ultrafine particle to at least one of a high refractive-index layer and a low refractive-index layer, especially to a high refractive-index layer, each composed of the above-described crosslinked polymer.

The ultrafine particles for use in the present invention must have a primary diameter of 100 nm or less. By controlling the primary diameter of the ultrafine particles to 100 nm or less, a good optical interference layer can be formed without causing whitening of the film. The primary diameter is preferably 80 nm or less, more preferably 60 nm or less. The lower limit is 5 nm, though this is not particularly limited.

This ultrafine particle mainly comprises a metal oxide and/or a metal fluoride. Examples of the metal oxide and metal fluoride include $Al_2O_3$, $Bi_2O_3$, $CeO_2$, $In_2O_3$, $In_2O_3.SnO_2$, $HfO_2$, $La_2O_3$, $MgF_2$, $Sb_2O_5$, $Sb_2O_5.SnO_2$, $SiO_2$, $SnO_2$, $TiO_2$, $Y_2O_3$, $ZnO$ and $ZrO_2$.

Among these, $Bi_2O_3$, $CeO_2$, $In_2O_3$, $In_2O_3.SnO_2$, $HfO_2$, $La_2O_3$, $Sb_2O_5.Sb_2O_5.SnO_2$, $SnO_2$, $TiO_2$, $Y_2O_3$, $ZnO$ and $ZrO_2$ are preferred as the ultrafine particles contained in the high refractive-index layer, and $Al_2O_3$, $MgF_2$ and $SiO_2$ are preferred as the ultrafine particles contained in the low refractive-index layer.

These ultrafine particles may be used individually or in combination of two or more thereof.

The weight ratio of the ultrafine particles and the crosslinked polymer is preferably from 1:99 to 80:20, more preferably from 5:95 to 80:20. If the weight ratio of the ultrafine particles and the crosslinked polymer is less than 1:99, the effect of adjusting the refractive index cannot be obtained, whereas if the weight ratio of the ultrafine particles and the crosslinked polymer exceeds 80:20, the strength and adhesive property necessary for the optical interference layer may be insufficient. The weight ratio is still more preferably from 30:70 to 65:35. In practice, the weight ratio of the ultrafine particles and the crosslinked polymer is preferably determined based on the use ratio at the time of preparing the coating solution of the ultrafine particles and the starting material constituting the crosslinked polymer.

The ultrafine particle may be incorporated into the crosslinked polymer by mixing the ultrafine particle in the starting material of the crosslinked polymer at the initial stage in the above-described process of producing a crosslinked polymer layer, then coating it as described above and performing hydrolysis and condensation polymerization or performing a crosslinking reaction.

(1d) High Refractive-index Layer and Low Refractive-index Layer

The optical interference layer comprises at least one high refractive-index layer and at least one low refractive-index layer and may comprise two or more combination units of a high refractive-index layer and a low refractive-index layer. In the case where the optical interference layer consists of one high refractive-index layer and one low refractive-index layer, the thickness of the optical interference layer is preferably from 30 to 150 nm, more preferably from 50 to 150 nm.

The high refractive-index layer constituting the optical interference layer is, as described above, a single film formed from a layer obtained by the hydrolysis and condensation polymerization of a metal alkoxide or a crosslinked polymer layer comprising a thermosetting resin or a radiation-curable resin, a film formed from a layer obtained by the hydrolysis and condensation polymerization of a mixture comprising a metal oxide ultrafine particle and/or a metal fluoride ultrafine particle and a metal alkoxide, or a film formed by the crosslinking polymerization of a mixture of a metal oxide ultrafine particle and/or a metal fluoride ultrafine particle with a thermosetting resin or a radiation-curable resin. The thickness of the film formed is preferably from 15 to 100 nm, more preferably from 20 to 70 nm. The refractive index of the high refractive-index layer is larger than the refractive index of the low refractive-index layer and the difference in the refractive index is preferably 0.2 or more, more preferably 0.25 or more.

The low refractive-index layer constituting the optical interference layer is, as described above, a single film formed from a layer obtained by the hydrolysis and condensation polymerization of a metal alkoxide or a crosslinked polymer layer comprising a thermosetting resin or a radiation-curable resin, a film formed from a layer obtained by the hydrolysis and condensation polymerization of a mixture comprising a metal oxide ultrafine particle and/or a metal fluoride ultrafine particle and a metal alkoxide, or a film formed by the crosslinking polymerization of a mixture of a metal oxide ultrafine particle and/or a metal fluoride ultrafine particle with a thermosetting resin or a radiation-curable resin. The thickness of the film formed is preferably 15 to 100 nm, more preferably from 20 to 70 nm. The refractive index of the low refractive-index layer is preferably 1.6 or less.

When a layer obtained by the hydrolysis and condensation polymerization of a metal alkoxide or a crosslinked polymer layer comprising a thermosetting resin or a radiation-curable resin is used as the high refractive-index layer and the low refractive-index layer, this is advantageous in view of cost, however, both an excellent optical interference effect (desired transparency and difference in the refractive index) and an excellent writing durability can hardly be attained at the same time. According to the present invention, not only is a crosslinked polymer layer used as the high refractive-index layer and the low refractive-index layer but also the above-described ultrafine particle is added to at least one of the high refractive-index layer and the low refractive-index layer, preferably to the high refractive-index layer, preferably by controlling the amount added, whereby an optical interference layer having both a good optical interference effect and a good writing durability can be formed without causing whitening of the film.

In the case where the low refractive-index layer is composed of a crosslinked polymer comprising a radiation-curable resin or a thermosetting resin, it is preferred that the high refractive-index layer contains an ultrafine particles A and fine particles B (described later) in accordance with the present invention and that the low refractive-index layer does not contain fine particles (ultrafine particle A and fine particle B).

(1e) Suitable Combination of High Refractive-index Layer and Low Refractive-index Layer In one preferred embodiment of the present invention, the optical interference layer comprises a high refractive-index layer and a low refractive-index layer, the low refractive-index layer is in contact with the transparent electroconductive layer, the low refractive-index layer comprises a layer obtained by hydrolysis and condensation polymerization of silicon alkoxide, the high refractive-index layer comprises a layer obtained by hydrolysis and condensation polymerization of a metal alkoxide mainly comprising a metal alkoxide other than alkoxysilane, and the high refractive-index layer contains an ultrafine particle comprising a metal oxide. To obtain the high refractive-index layer a metal alkoxide other than alkoxysilane is used, as the main component of the metal alkoxide, and the high refractive-index layer contains an ultrafine particle, whereby a high refractive index can be maintained and the transparent electroconductive laminate can have good writing durability.

Examples of the metal alkoxide other than alkoxysilane include titanium alkoxide and zirconium alkoxide. Specific examples of the titanium alkoxide and zirconium alkoxide are described above.

The content of the metal alkoxide other than alkoxysilane, which is used as the main component of the metal alkoxide, is preferably from 50 to 100%, more preferably from 70 to 100%. In practice, the content is suitably determined based on the use ratio at the time of preparing the coating solution of the metal alkoxide.

The ultrafine particle for use in the high refractive-index layer is preferably a metal oxide ultrafine particle, for example, a metal oxide ultrafine particle selected from $Bi_2O_3$, $CeO_2$, $In_2O_3$, $In_2O_3.SnO_2$, $HfO_2$, $La_2O_3$, $Sb_2O_5$, $Sb_2O_5.SnO_2$, $SnO_2$, $TiO_2$, $Y_2O_3$, $ZnO$ and $ZrO_2$. The ultrafine particles can be used individually or in combination of two or more thereof.

By employing such a combination, the difference in the refractive-index can be made large while maintaining excellent adhesion between layers. The difference in the refractive-index is preferably at least 0.1 or more, more preferably 0.2 or more, more preferably 0.25 or more.

The weight ratio of the metal oxide ultrafine particle to the metal alkoxide is preferably from 1:99 to 60:40, more preferably from 5:95 to 50:50.

This high refractive-index layer can be formed by the same method as the method described above for forming a mixture of a metal alkoxide and ultrafine particles.

The low refractive-index layer used in combination with the high refractive-index layer is a layer formed by hydrolysis and condensation polymerization of alkoxysilane and this layer can also be formed as described above. This low refractive-index layer may also contain ultrafine particles, if desired.

The high refractive-index layer and the low refractive-index layer each preferably has the above-described film thickness and refractive index.

(1e) Second Fine Particle B (for Surface Roughening)

As described above, if the transparent electroconductive layer surface is roughened by adding, into a cured resin layer, a fine particle having an average primary diameter larger than the cured resin layer so as to prevent malfunctions of a transparent touch panel due to a sticking phenomenon of two transparent electroconductive layer surfaces of the movable electrode substrate and the fixed electrode substrate, the display grade of a high resolution color liquid crystal display decreases on viewing it through the transparent touch panel.

The present inventors have found that when for roughening the transparent electroconductive layer surface, a fine particle (hereinafter sometimes referred to as a fine particle B) is added to at least one of the high refractive-index layer and the low refractive-index layer constituting the optical interference layer and having a thickness smaller than that of the cured resin layer, the transparent electroconductive layer surface can be roughened even by using a fine particle having an average primary diameter smaller than that of the fine particle added to the cured resin layer.

It has been also found that by controlling the average primary diameter and amount of the fine particle added, the transparent electroconductive layer surface can be roughened within the range of not causing glare due to scattering of RGB three primary-color lights coming out of the liquid crystal display. It has been confirmed that when a transparent touch panel using a transparent electroconductive laminate, with a transparent electroconductive layer surface roughened, is disposed on a high resolution color liquid crystal display and the liquid crystal display is viewed through the transparent touch panel, the display grade is good and is equal to the case where a transparent touch panel using a conventional transparent electroconductive laminate containing substantially no fine particle in the cured resin layer and having a flat transparent electroconductive layer surface is disposed on a high resolution color liquid crystal display.

It has been also confirmed that a transparent touch panel using a transparent electroconductive laminate with the transparent electroconductive layer surface being roughened by adding a fine particle to at least one of the high refractive-index layer and the low refractive-index layer constituting the optical interference layer does not bring about malfunctions due to a sticking phenomenon between two transparent electroconductive layers of the movable electrode substrate and the fixed electrode substrate.

As a result, according to a second aspect of the present invention, a transparent electroconductive layer and a transparent touch panel can be provided, where the display grade does not decrease when a transparent touch panel is disposed on a high resolution color liquid crystal display and the liquid crystal display is observed through the transparent touch panel, malfunctions due to a sticking phenomenon between two transparent electroconductive layer surfaces of the movable electrode substrate and the fixed electrode substrate constituting the transparent touch panel are not caused, and high reliability can be ensured in the writing durability and the like required of the transparent touch panel.

Furthermore, the amount of the fine particle B added to at least one of the high refractive-index layer and the low refractive-index layer constituting the optical interference layer is controlled to 0.5 wt % or less of the crosslinked polymer, preferably metal alkoxide component, constituting the layer to which the fine particle B is added, whereby a good optical interference layer, free from white turbidity, can be formed without impairing the effect of preventing malfunctions of the touch panel due to a sticking phenomenon between two transparent electroconductive layer surfaces of the movable electrode substrate and the fixed electrode substrate.

When the fine particle B is excessively added to at least one of the high refractive-index layer and the low refractive-index layer constituting the optical interference layer, the fine particle added readily falls off or the adhesion between the optical interference layer and the cured resin layer decreases and the reliability in writing durability required of the touch panel may be impaired. The fine particle B is preferably contained only in the high refractive-index layer or in both the high refractive-index layer and the low refractive-index layer.

The fine particle B added to at least one of the high refractive-index layer and the low refractive-index layer constituting the optical interference layer of the present invention may be either an inorganic material or an organic material and is not particularly limited on the refractive index (preferably close to the refractive index of the high refractive-index layer and the low refractive-index layer). Examples thereof include a silica fine particle, a crosslinked acryl fine particle and a crosslinked polystyrene fine particle.

The average primary diameter of the fine particle B is as large as 1.1 times or more the film thickness of the optical interference layer and at the same time, the average primary diameter is 1.2 µm or less. If the average primary diameter of the fine particle is less than 1.1 times the film thickness of the optical interference layer, the transparent electroconductive layer surface can be hardly roughened. Also, if the average primary diameter of the fine particle exceeds 1.2 µm, when a transparent touch panel using a transparent electroconductive laminate containing such a fine particle in at least one of the high refractive-index layer and the low refractive-index layer constituting the optical interference layer is disposed on a high resolution color liquid crystal display and the liquid crystal display is viewed through the transparent touch panel, the liquid crystal display glares and the display grade decreases. Furthermore, if the average primary diameter of the fine particle exceeds 1.2 µm, the average primary diameter is much larger than the film thickness of the optical interference layer to which the fine particle is added, therefore, the fine particle added readily falls off from the optical interference layer and the reliability in writing durability or the like required of the transparent touch panel can be hardly ensured.

The optical interference layer comprises at least one high refractive-index layer and at least one low refractive-index layer and may comprise two or more combination units of a high refractive-index layer and a low refractive-index layer. In the case where the optical interference layer consists of one high refractive-index layer and one low refractive-index layer, the thickness of the optical interference layer is preferably from 30 to 150 nm, more preferably from 50 to 150 nm. The average primary diameter of the fine particle B added to at least one of the high refractive-index layer and the low refractive-index layer constituting the optical interference layer is 1.1 times or more the film thickness of the optical interference layer and at the same time, 1.2 µm or less, preferably from 0.3 to 1.2 µm, more preferably from 0.5 to 1.0 µm.

In the optical interference layer, particularly, in the high refractive-index layer, fine particles A (above-described ultrafine particle) comprising a metal oxide and/or a metal fluoride and having an average primary diameter of 100 nm or less may be added individually or in combination of two or more in an appropriate amount as in the case above (first aspect of the present invention) for the purpose of adjusting the refractive index but may not be added.

In the case of adding the fine particle A to the optical interference layer, the weight ratio of the fine particle A to the metal alkoxide is preferably from 0:100 to 60:40, more preferably from 0:100 to 80:20, still more preferably from 0:100 to 40:60. If the weight ratio of the fine particles A to the metal alkoxide exceeds 80:20, the strength or adhesive property necessary for the optical interference layer may be insufficient and this is not preferred.

Other matters regarding this fine particle A are the same as those described above for the ultrafine particle.

(2) Cured Resin Layer

In the transparent electroconductive laminate of the present invention, a cured resin layer may be formed between the optical interference layer and the organic polymer film. The cured resin layer is a layer capable of contributing to the improvement of abrasion resistance, flexibility and the like. As the material for forming this cured resin layer, a curable resin such as a thermosetting resin and a radiation-curable resin (for example, curable with ultraviolet light) can be used. Specific examples of the curable resin include an organosilane-base thermosetting resin starting from methyltriethoxysilane, phenyltriethoxysilane or the like, a melamine-base thermosetting resin starting from etherified methylolmelamine or the like, and a polyfunctional acrylate-base ultraviolet-curable resin starting from polyol acrylate, polyester acrylate, urethane acrylate, epoxy acrylate or the like.

In this cured resin layer, the surface where the optical interference layer is usually stacked may be rich in the flatness or may be roughened. In the case of roughening the surface, for example, a silica fine particle may be incorporated into the cured resin layer. However, in using the second aspect of the present invention, the surface where the optical interference layer is stacked need not be roughened and is preferably flat. More specifically, in using the second aspect of the present invention, the cured resin layer present between the optical interference layer and the organic polymer film in the transparent electroconductive laminate of the present invention preferably contains substantially no fine particles. If a particle size having an average primary diameter larger than the film thickness of the cured resin layer is added in the cured resin layer, this may provide an effect of preventing malfunctions of the transparent touch panel due to a sticking phenomenon between two transparent electroconductive layer surfaces of the movable electrode substrate and the fixed electrode substrate, but there arises a problem that the display grade of a high resolution color liquid crystal display decreases when observed through the transparent touch panel. Furthermore, if a fine particle having an average primary diameter smaller than the film thickness of the cured resin layer is added, not only an effect of preventing malfunctions of the transparent touch panel due to the above-described sticking phenomenon is not provided but also, depending on the size of the fine particle, there arises a similar problem that the display grade of a high resolution color liquid crystal display decreases when observed through the transparent touch panel. However, the cured resin layer may contain a fine particle in the range of not inhibiting the display grade of a high resolution color liquid crystal display when observed through the transparent touch panel.

For the purpose of preventing the generation of interference fringe between the movable electrode substrate and the fixed electrode substrate, a protrusion is preferably formed on the transparent electroconductive layer surface. The surface shape preferred for preventing the generation of interference fringe is such that the average protrusion height is from 0.3 to 1 µm and the protrusion density is from 350 to 1,800 pieces/mm$^2$. When a transparent electroconductive laminate comprising a cured resin layer having a surface shaped as such is used for the movable electrode substrate and/or the fixed electrode substrate of the touch panel, an interference fringe is not generated between two transparent electroconductive layers even when the movable electrode substrate is warped to come close to the fixed electrode substrate, and therefore, the display can be clearly viewed. If the average protrusion height is less than 0.3 µm or the protrusion density is less than 350 pieces/mm$^2$, the effect of preventing the generation of interference fringe is small. On the other hand, if the average protrusion height exceeds 1 µm, the pen writing durability disadvantageously decreases. Furthermore, if the protrusion density exceeds 1,800 pieces/mm$^2$, the haze of the transparent electroconductive laminate increases to cause a problem that the letter on the display is blurred and cannot be clearly viewed. Of course, when the purpose is only to prevent sticking, the average protrusion height may be less than 0.3 µm or the protrusion density may be less than 350 pieces/mm$^2$.

Here, the average protrusion height and the protrusion density were determined as follows. Using a real time scanning laser microscope (1LM21D, manufactured by Lasertec Corporation), from 10 to 20 protrusions were selected at random within a 250 µm-square visual field and after measuring the height of each protrusion, the average protrusion height was calculated. Also, from the number of protrusions in the same visual field, the protrusion density (the number of protrusions per unit area) was calculated.

The thickness of the cured resin layer is preferably from 2 to 5 µm in view of flexibility and friction durability.

The cured resin layer can be formed by a coating method. In practical coating, the above-described compound and various additives (e.g., curing agent, catalyst) are dissolved in an organic solvent of various types and after adjusting the concentration or viscosity, the obtained coating solution is coated on an organic polymer film. Thereafter, the layer is cured by irradiating a radiation or applying a heat treatment. Examples of the coating method include various coating methods such as microgravure coating method, Mayer bar coating method, direct gravure coating method, reverse roll coating method, curtain coating method, spray coating method, comma coating method, die coating method, knife coating method, spin coating method, doctor knife method and dipping method.

The thickness of the cured resin layer is preferably from 2 to 5 µm in view of flexibility and friction resistance.

The cured resin layer is stacked on an organic polymer film directly or through an appropriate anchor layer. Preferred examples of the anchor layer include a layer having a function of improving the adhesion between the cured resin layer and the organic polymer film, various phase compensating layers such as layer having a three-dimensional refractive index property of giving a negative K value ($K=\{(n_x+n_y)/2-n_z\}\times d$, wherein $n_x$, $n_y$ and $n_z$ represent refractive indices in the x-axis, y-axis and z-axis directions, respectively, the x-axis and y-axis are orthogonal axes in the film plane and the z-axis is in the film thickness direction), a layer having a function of preventing permeation of water or air or a function of absorbing water or air, a layer having a function of absorbing ultraviolet or infrared light, and a layer having a function of decreasing the electrostatic charging property of the substrate.

(3) Organic Polymer Film

The organic polymer compound constituting the organic polymer film for use in the present invention is not particularly limited as long as it is a transparent organic polymer having excellent heat resistance. Examples thereof include a polyester-base resin (e.g., polyethylene terephthalate, polyester-2,6-naphthalate, polydiallyl phthalate), a polycarbonate resin, a polyethersulfone resin, a polysulfone resin, a polyarylate resin, an acrylic resin, a cellulose acetate resin, a cyclic polyolefin and a norbornene resin. Needless to say, these may be used as a homopolymer or a copolymer or may be used individually or as a blend. Furthermore, two or more sheets of the organic polymer film formed from such a resin may be laminated with each other using a pressure-sensitive adhesive or the like and used as a multilayered organic polymer film.

In the case of using the transparent electroconductive laminate of the present invention as the movable electrode substrate of a transparent touch panel, the substrate shape of the organic polymer film is preferably a film form having a thickness of 75 to 400 μm in view of the strength to maintain the flexibility and flatness for actuating the transparent touch panel as a switch. In the case of use as the fixed electrode substrate, a sheet form having a thickness of 0.4 to 4.0 mm is preferred in view of the strength to maintain the flatness, however, a film form having a thickness of 50 to 400 μm may also be used by laminating it with another sheet to have an entire thickness of 0.4 to 4.0 mm.

In the case of using the transparent electroconductive laminate of the present invention as the movable electrode substrate of a transparent touch panel, the fixed electrode substrate may be produced by forming a transparent electroconductive layer on the above-described organic polymer film substrate, a glass substrate or a laminate substrate thereof. In view of the strength and weight of the transparent touch panel, the thickness of the fixed electrode substrate comprising a single layer or a laminate is preferably from 0.4 to 2.0 mm.

In recent years, a new transparent touch panel having a constitution that a polarizer or (a polarizer+a retardation film) is stacked in the input side (user side) of the transparent touch panel has been developed. This constitution is advantageous in that the reflectance of extraneous light inside the transparent touch panel is reduced to a half or less mainly by the optical action of the polarizer or the polarizer+the retardation film) and the contrast of the display is improved when observed through the transparent touch panel.

In the transparent touch panel of this type, the polarized light passes through the transparent electroconductive laminate and, therefore, the organic polymer film used preferably has excellent optical isotropy. More specifically, assuming that the refractive index in the slow axis direction is $n_x$, the refractive index in the fast axis direction is $n_y$, and the thickness of the substrate is d (nm), the in-plane retardation value Re represented by $Re=(n_x-n_y) \times d$ (nm) is preferably at least 30 nm or less, more preferably 20 nm or less. Here, the in-plane retardation value of the substrate is represented by the value at a wavelength of 590 nm measured using a spectroellipsometer (M-150 manufactured by JASCO Corporation).

In uses of this type of transparent touch panel where polarized light passes through the transparent electroconductive laminate, the in-plane retardation value of the transparent electrode substrate is very important. In addition, the transparent electrode substrate preferably has a three-dimensional refractive index property, more specifically, the K value represented by $K=\{(n_x+n_y)/2-n_z\} \times d$ is from −250 to +150 nm and for obtaining an excellent view an angle property of the transparent touch panel, more preferably from −200 to +100 nm.

Examples of the organic polymer film exhibiting excellent properties in the optical isotropy include a casted substrate of a polycarbonate, an amorphous polyarylate, a polyethersulfone, a polysulfone, a triacetyl cellulose, a diacetyl cellulose, an amorphous polyolefin or their modified product or copolymer with a different kind of material; a casted substrate of a thermosetting resin such as epoxy-base resin; and a casted substrate of an ultraviolet-curable resin such as acrylic resin. In view of castability, production cost, thermal stability and the like, a casted substrate of a polycarbonate, an amorphous polyarylate, a polyethersulfone, a polysulfone, an amorphous polyolefin or their modified product or copolymer with a different kind of material is most preferred.

More specifically, examples of the polycarbonate casted substrate preferably used include a casted substrate of a polycarbonate having an average molecular weight of approximately from 15,000 to 100,000 (examples of the commercial product include "PURE ACE" produced by Teijin Ltd., "PANLIGHT" produced by Teijin Chemicals Ltd., and "Apec HT" produced by Bayer), which is a polymer or copolymer using, as the monomer unit, at least one component selected from the group consisting of bisphenol A, 1,1-di-(4-phenol)cyclohexylidene, 3,3,5-trimethyl-1,1-di(4-phenol)cyclohexylidene, fluorene-9,9-di(4-phenol) and fluorene-9,9-di(3-methyl-4-phenol), or a mixture thereof.

Examples of the amorphous polyarylate casted substrate include casted substrates of, as the commercial product, "ELMECK" produced by Kanegafuchi Chemical Industry Co., Ltd., "U POLYMER" produced by Unitika Ltd., and "ISARYL" produced by Isonova.

Examples of the amorphous polyolefin casted substrate include casted substrates of, as the commercial product, "ZEONOR" produced by ZEON Corporation, and "ARTON" produced by JSR.

Examples of the method for casting the polymer material include a melt extrusion method, a solution casting method and an injection molding method, however, from the standpoint of obtaining excellent optical isotropy, the polymer material is preferably casted by the solution casting method.

(4) Transparent Electroconductive Layer

In the present invention, a transparent electroconductive layer is stacked on the low refractive-index layer to come into contact with the layer. By stacking a transparent electroconductive layer to come into contact with the low refractive-index layer, the optical properties and mechanical properties such as writing durability of the transparent electroconductive laminate are improved. Examples of the transparent electroconductive layer include an ITO film containing from 2 to 20 wt % of tin oxide, and a tin oxide film doped with antimony, fluorine or the like. Examples of the method for forming the transparent electroconductive layer include a PVD method such as sputtering, vacuum evaporation and ion plating, a coating method, a printing method and a CVD method. Among these, a PVD method and a CVD method are preferred. In the case of the PVD method or the CVD method, the thickness of the transparent electroconductive layer is preferably from 5 to 50 nm in view of transparency and electric conductivity. The transparent electroconductive layer is preferably a film mainly comprising a crystalline indium oxide, more preferably a film mainly comprising a crystalline indium oxide having a crystal grain size of 2,000 nm or less. If the crystal grain size exceeds 2,000 nm, the pen writing durability is worsened and this is not preferred. In view of stability of optical properties and resistance value, the thickness is more preferably from 12 to 30 nm. If the thickness of the transparent electroconductive layer is less than 12 nm, the resistance value is liable to have poor aging stability, whereas if it exceeds 30 nm, the transmittance of the transparent electroconductive laminate decreases and this is not preferred. In view of reduction in the power consumption of the touch panel or necessity in the circuit processing, a transparent electroconductive layer showing a surface resistance value of 100 to 2,000Ω/□ (Ω/square), more preferably from 140 to 2,000Ω/□ (Ω/square), with the thickness of 12 to 30 nm is preferably used.

In the layer mainly comprising a crystalline indium oxide, one or more metal oxide such as tin oxide, silicon oxide, titanium oxide, aluminum oxide, zirconium oxide and zinc oxide may be added so as to improve the transparency or adjust the surface resistance value or the like. In particular, a crystalline indium tin oxide (ITO) is preferred because of its excellent transparency and electric conductivity.

As one example of the method for obtaining a layer mainly comprising a crystalline indium oxide having a crystal grain size of 2,000 nm or less, a method for obtaining a crystalline indium tin oxide film is described below. First, an amorphous indium tin oxide film containing microcrystal is stacked by using a known PVD method such as sputtering, ion plating or vacuum evaporation. Then, an annealing treatment is performed at a temperature of 100 to 150° C. to grow the crystal from the microcrystal. Depending on the deposition conditions by the PVD method, for example, a film where the crystal grain size is distributed in the range from a minimum grain size of 10 nm to a maximum grain size of 300 nm, or a film where the crystal grain size is distributed in the range from a minimum grain size of 250 nm to a maximum grain size of 2,000 nm is obtained. When such a film is used as the transparent electroconductive layer of the present invention, the pen writing durability is improved. From this, it is presumed that the stress imposed on the transparent electroconductive layer at the writing with a pen is relieved at the grain boundary due to the film structure where the crystal grain size is distributed, and the film strength of the transparent electroconductive layer itself is improved. The crystal grain size as used herein is defined as a largest size among diagonal lines or diameters in the polygonal or elliptic region observed through a transmission-type electron microscope.

(5) Cured Resin Layer on Another Surface

In the case of using the transparent electroconductive laminate of the present invention as the movable electrode substrate, a cured resin layer is preferably stacked on the surface where, in a transparent touch panel, an external force is applied. Examples of the material for forming the cured resin layer include an organosilane-base thermosetting resin starting from methyltriethoxysilane, phenyltriethoxysilane or the like, a melamine-base thermosetting resin starting from etherified methylolmelamine or the like, and a polyfunctional acrylate-base ultraviolet-curable resin starting from polyol acrylate, polyester acrylate, urethane acrylate, epoxy acrylate or the like. If desired, a silica ultrafine particle or the like may be mixed. The thickness of the cured resin layer is preferably from 2 to 5 μm in view of flexibility and friction durability.

(6) Intermediate Layer

In the transparent electroconductive laminate of the present invention, an intermediate layer such as adhesive layer may be stacked between respective layers constituting the transparent electroconductive laminate, that is, between the organic polymer film and the cured resin layer and between the cured resin layer and the optical interference layer, as far as it does not impair the object of the present invention.

For example, the cured resin layer is stacked on the organic polymer film directly or through an appropriate anchor layer. Preferred examples of the anchor layer include a layer having a function of improving the adhesion between the cured resin layer and the organic polymer film, various phase compensating layers such as layer having a three-dimensional refractive index property of giving a negative K value, a layer having a function of preventing permeation of water or air or a function of absorbing water or air, a layer having a function of absorbing ultraviolet or infrared light, and a layer having a function of decreasing the electrostatic charging property of the substrate.

(7) Multilayer-Type Organic Polymer Film Substrate

In the case of using the transparent electroconductive laminate of the present invention as the movable electrode substrate of a touch panel, a constitution where a transparent substrate is stacked on the surface of the organic polymer film opposite the transparent electroconductive layer, through a transparent elastic layer having a Young's modulus lower than that of the organic polymer film may be employed so as to improve the finger touching durability, pen writing durability and reliability in a high-temperature or high-temperature high-humidity environment of the touch panel.

Figure 2:
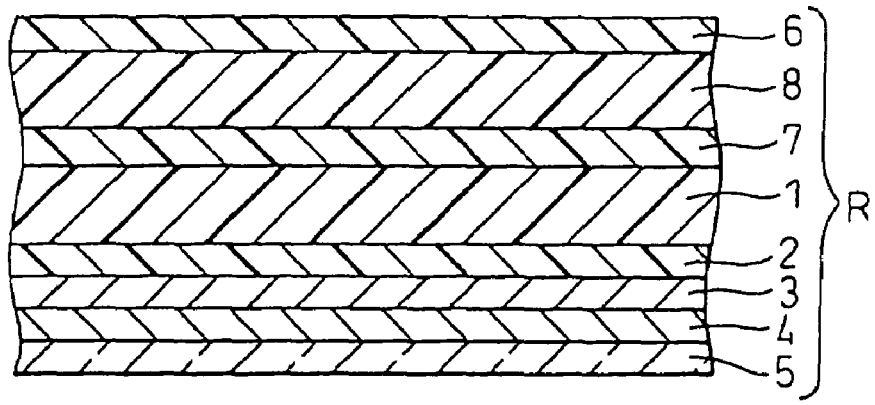
FIG. 2 is a view showing another constitution example of the transparent electroconductive laminate of the present invention.

FIG. 2 shows a constitution example of a transparent electroconductive laminate in this embodiment. In FIG. 2, the same members as in FIG. 1 are shown by the same reference numbers as in FIG. 1, that is, the members are an organic polymer film 1, a cured resin layer 2, a high refractive-index layer 3, a low refractive-index layer 4, a transparent electroconductive layer 5 and a cured resin layer 6. In this embodiment, the substrate film is constituted such that a transparent elastic layer 7 is interposed between the organic polymer film 1 and the transparent base material 8 and, on both surfaces thereof, a cured resin layer 2 or 6 is stacked.

The transparent elastic layer suitably used in the present invention is preferably a material having high transparency, being low in the Young's modulus than the organic polymer film, and capable of exhibiting good adhesive property both to the organic polymer film and the transparent substrate. For buffering the impact of a writing pen, the Young's modulus of the transparent elastic layer must be rendered smaller than the Young's modulus of the organic polymer film. However, if the Young's modulus is extremely small, the transparent elastic layer adheres to a blade in the process such as punching out or slitting of the transparent electroconductive laminate and this disadvantageously gives rise to a foreign particle defect. The Young's modulus is preferably from about ⅕th to 1/80th of the Young's modulus of the organic polymer film. For example, when the organic polymer film is a polyethylene terephthalate film, the Young's modulus of the transparent elastic layer is from $7 \times 10^7$ to $1 \times 10^9$ Pa.

The Young's modulus of the transparent elastic layer is measured by a nano indentation tester (ENT-1100a, manufactured by Elionix). A triangular pyramid-shaped indenter (angle between edges: 115°, diamond) is pressed into the surface of the transparent elastic layer (in the side opposite the organic polymer film) to a depth of 0.5 μm under a load of 15 mgf (147 μN) and from the gradient of the graph on removing the load, the Young's modulus is calculated.

The thickness of the transparent elastic layer is from 5 to 45 μm, preferably from 10 to 40 μm. If the thickness is less than 5 μm, the effect of buffing the impact of a writing pen is small, whereas if it exceeds 45 μm, the transparent elastic layer adheres to a blade in the process such as punching out or slitting of the transparent electroconductive laminate and this disadvantageously gives rise to a foreign particle defect.

Examples of the material used for the transparent elastic layer include a polyester-base resin, an acryl-base resin, a polyurethane-base resin, an epoxy-base resin and a silicone-base resin. Among these, a silicone-base resin is preferred because the Young's modulus is less changed in the process of manufacturing a touch panel or when left stand in a high-temperature environment.

(8) Touch Panel

In a transparent touch panel where two sheets of transparent electrode substrates each having stacked on at least one surface thereof a transparent electroconductive layer are disposed such that the transparent electroconductive layers face each other, the transparent electroconductive laminate of the present invention can be used as at least one sheet of the transparent electrode substrates. This is more specifically described in Examples later.

Figure 3:
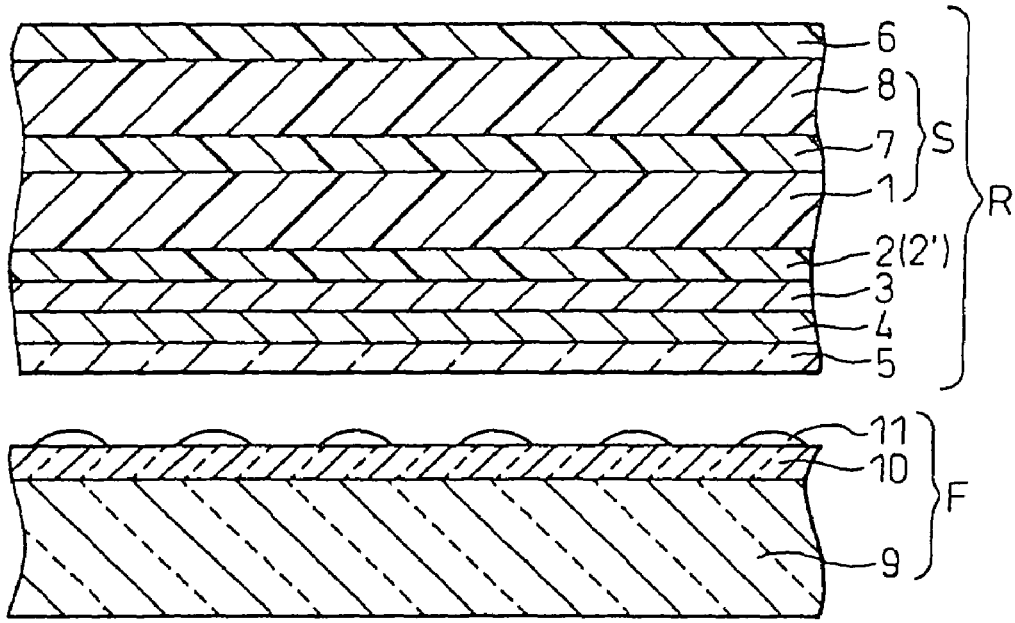
FIG. 3 is a schematic view of a touch panel.

FIG. 3 shows a constitution example of a touch panel using the transparent electroconductive laminate of the present invention.

The transparent electroconductive laminate P or R shown in FIG. 1 or 2 is used as one electrode substrate. In FIG. 3, the transparent electroconductive laminate R of FIG. 2 is used as the movable electrode substrate and a fixed electrode substrate F where a transparent electroconductive layer 10 is formed on the surface of a glass substrate 9 and dot spacers 11 are further formed on the surface thereof is disposed to face the transparent electroconductive layer 5, thereby fabricating a touch panel. The space between the movable electrode substrate R and the fixed electrode substrate F is usually set to 10 to 100 μm using a spacer (not shown). When the surface of the movable electrode substrate is touched with a finger or a pen, the movable electrode substrate R and the fixed electrode substrate F are put into contact with each other at the touched position and therefore, the input position can be detected due to the potential difference. The dot spacer 11 prevents the movable electrode substrate R from warping to come into contact by a natural force with the fixed electrode substrate, but this is formed to enable the input with a finger or a pen and is not essential.

Figure 4:
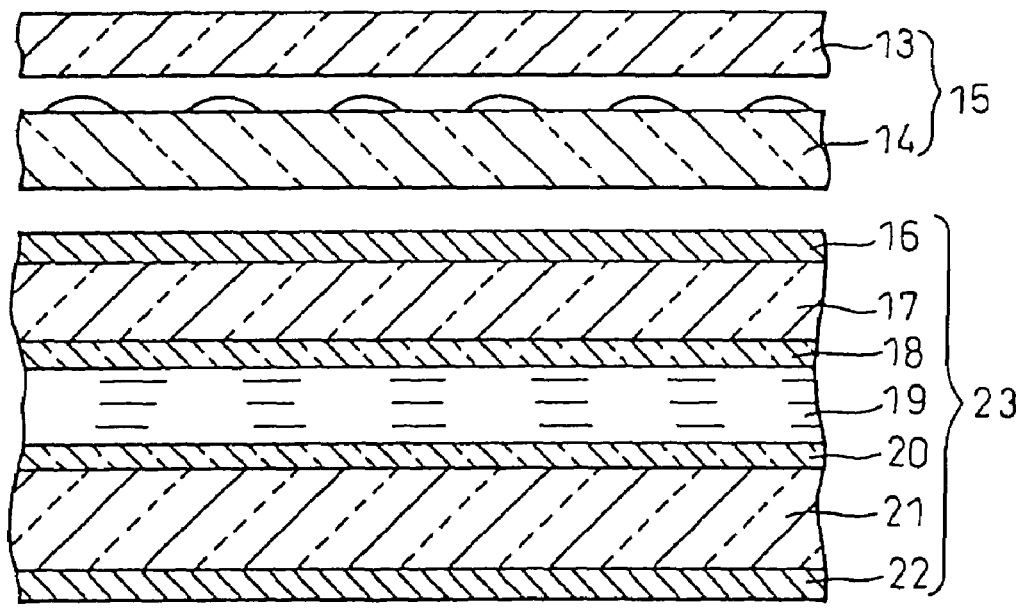
FIG. 4 is a view showing a constitution example where a touch panel is fixed on a liquid crystal display device.

FIG. 4 shows an example where a touch panel is fixed on a liquid crystal display device. In FIG. 4, a touch panel 15 comprising a movable electrode substrate 13 and a fixed electrode substrate 14, which are facing each other, is disposed on a liquid crystal display device 23. The liquid crystal display device 23 is typically constituted such that a liquid crystal layer 19 is interposed between two glass substrates 17 and 21 each having stacked on the inside surface thereof a transparent electrode 18 or 20 and in the outer side of each glass substrate 17 or 21, a polarizer 16 or 22 is disposed. Of course, the specific constitution of the liquid crystal display device is not limited to this example and a constitution example where, for example, the polarizer is not disposed in the liquid crystal display device but in the touch panel, may be employed.

EXAMPLES

The present invention is described in greater detail below, however, the present invention is not limited thereto.

In the following Examples, the linearity, Young's modulus and average primary diameter were measured as follows.

Linearity

A d.c. voltage of 5 V was applied between parallel electrodes on the movable electrode substrate or on the fixed electrode substrate. The voltage was measured at intervals of 5 mm in the direction perpendicular to the parallel electrodes. Assuming that the voltage at the measurement start point A is EA, the voltage at the measurement finish point B is EB, the measured voltage value at a distance X from A is EX, the theoretical value is ET and the linearity is L, $ET=(EB-EA)\cdot X/(B-A)+EA$ $L(\%)=(|ET-EX|)/(EB-EA)\times 100$ Young's Modulus The Young's modulus was measured by a nano indentation tester (ENT-1100a, manufactured by Elionix). A triangular pyramid-shaped indenter (angle between edges: 115°, diamond) was pressed into the surface of the transparent elastic layer to a depth of 0.5 μm under a load of 15 mgf (1.47 μN) and from the gradient of the graph on removing the load, the Young's modulus was calculated.

Average Primary Diameter of Fine Particle

The average primary diameter was measured using a laser scattering particle size distribution analyzer.

Example 1

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

γ-glycidoxypropyltrimethoxysilane ("KBM403", produced by Shin-Etsu Chemical Co., Ltd.) and methyltrimethoxysilane ("KBM13", produced by Shin-Etsu Chemical Co., Ltd.) were mixed at a molar ratio of 1:1 and this silane was hydrolyzed by a known method using an aqueous acetic acid solution (pH=3.0). To the thus-obtained hydrolysate of silane, N-β(aminoethyl)γ-aminopropylmethoxysilane ("KBM603", produced by Shin-Etsu Chemical Co., Ltd.) was added at a weight ratio of 20:1 as a solid content. The resulting solution was diluted with a mixed solution of isopropyl alcohol and n-butanol to prepare Alkoxysilane Coating Solution A.

Thereafter, a ZnO fine particle having a primary diameter of 20 nm was mixed in Coating Solution A to prepare Coating Solution B where the weight ratio of ZnO fine particle to alkoxysilane was 75:25. Coating Solution B was coated on the PET surface opposite the cured resin layer (1) by a bar coating method and baked at 130° C. for 2 minutes to form a high refractive-index layer having a thickness of 70 nm. Subsequently, Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer by a sputtering method using an indium-tin oxide target having a composition of indium oxide and tin oxide in a weight ratio of 9:1 and having a packing density of 98%, to produce a transparent electroconductive laminate for use as a movable electrode substrate. The transparent electroconductive laminate after the ITO layer formation had the total luminous transmittance of 91.3% and a haze value of 2.4%.

Separately, $SiO_2$ was dip-coated on both surfaces of a 1.1 mm-thick glass plate and thereon, an ITO layer having a thickness of 18 nm was formed in the same manner as above by the sputtering method. On this ITO layer, dot spacers with a height of 7 μm, a diameter of 70 μm and a pitch of 1.5 mm were formed to produce a fixed electrode substrate. Using these fixed electrode substrate and movable electrode substrate thus produced, a transparent touch panel shown in FIG. 5 was produced. A writing durability test of reciprocating straight lines 300,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed. The results are shown in Table 1.

Example 2

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material where a silica particle having an average primary diameter of 4.0 μm was mixed in a ratio of 0.1 part by weight per 100 parts by weight of the resin solid content. Incidentally, in the following Examples, when a silica particle was mixed in the cured resin layer, this constitution was used in all cases.

An $SnO_2$ fine particle having a primary diameter of 50 nm was mixed in Coating Solution A used in Example 1 to prepare Coating Solution C where the weight ratio of $SnO_2$ fine particle to alkoxysilane was 50:50. Coating Solution C was coated on the silica particle-containing cured resin layer (2) by a bar coating method and baked at 130° C. for 2 minutes to form a high refractive-index layer having a thickness of 70 nm. An $MgF_2$ fine particle having a primary diameter of 90 nm was mixed in Coating Solution A used in Example 1 to prepare Coating Solution D where the weight ratio of $MgF_2$ fine particle to alkoxysilane was 10:90. Coating Solution D was coated on the high refractive-index layer by a bar coating method and baked at 130° C. for 2 minutes to form a low refractive-index layer having a thickness of 50 nm, thereby producing an optical interference layer consisting of a high refractive-index layer and a low refractive-index layer. Furthermore, an indium tin lower oxide layer was formed on the low refractive-index layer by a reactive sputtering method using, as the sputtering target, an indium-tin alloy target having a composition of indium and tin in a weight ratio of 9:1 and then heat-treated at 150° C. for 15 hours to form a crystalline ITO layer having a thickness of 19 nm and a surface resistance value of about 400Ω/□ (about 400Ω/square), whereby a transparent electroconductive laminate for use as a movable electrode substrate was produced. The transparent electroconductive laminate after the ITO layer formation had the total luminous transmittance of 90.2% and a haze value of 2.8%.

Figure 5:
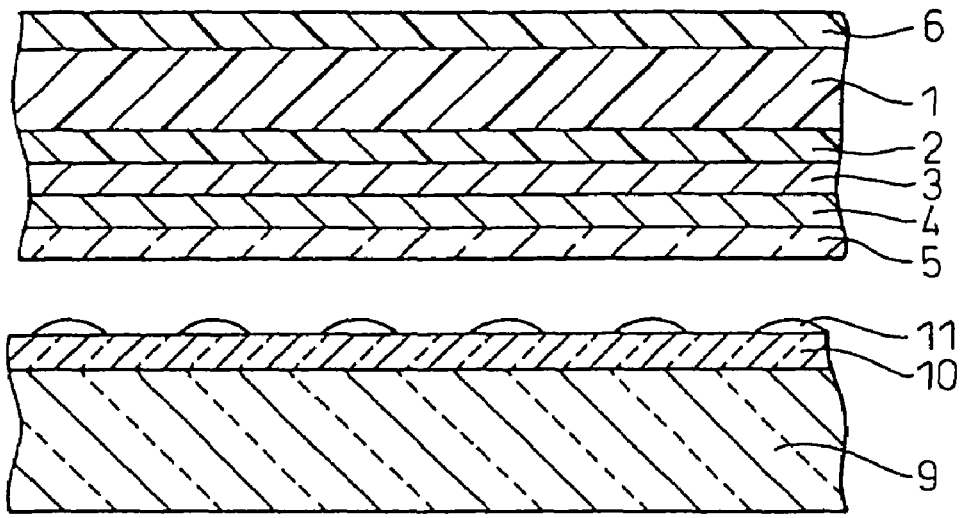
FIGS. 5 and 6 each is a view schematically showing the touch panel of Example.

Using the produced movable electrode substrate and a glass fixed electrode substrate with a transparent electroconductive layer produced in the same manner as in Example 1, a transparent touch panel shown in FIG. 5 was produced. A writing durability test of reciprocating straight lines 300,000 times under a load of 250 g was performed in the same manner as in Example 1. The test results are shown in Table 1.

Example 3

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle. A $ZrO_2$ fine particle having a primary diameter of 60 nm was mixed in Coating Solution A used in Example 1 to prepare Coating Solution E where the weight ratio of $ZrO_2$ fine particle to alkoxysilane was 50:50. Coating Solution E was coated on the silica particle-containing cured resin layer (2) by a bar coating method and baked at 130° C. for 2 minutes to form a high refractive-index layer having a thickness of 70 nm. An $Al_2O_3$ fine particle having a primary diameter of 20 nm was mixed in Coating Solution A used in Example 1 to prepare Coating Solution F where the weight ratio of $Al_2O_3$ fine particle to alkoxysilane was 15:85. Coating Solution F was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer in the same manner as in Example 2 to produce a transparent electroconductive laminate for use as a movable electrode substrate. The transparent electroconductive laminate after the ITO layer formation had the total luminous transmittance of 89.8% and a haze value of 2.5%.

Separately, on both surfaces of a 75 μm-thick polyethylene terephthalate film (OFW, produced by Teijin DuPont Films Japan Limited), a cured resin layer having a thickness of 3 μm was formed using an ultraviolet-curable urethane acrylate resin coating material. Coating Solution E was coated on the cured resin layer (2) on one surface by a bar coating method and baked at 130° C. for 2 minutes to form a high refractive-index layer having a thickness of 70 nm. Subsequently, Coating Solution F was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer in the same manner as in Example 2 to produce a transparent electroconductive laminate for use as a movable electrode substrate. The transparent electroconductive laminate after the ITO layer formation had the total luminous transmittance of 90.2% and a haze value of 1.5%. Using this transparent electroconductive laminate, a fixed electrode substrate was produced by attaching, using a pressure-sensitive adhesive, a 1.1 mm-thick polycarbonate sheet to come into contact with the surface opposite the surface where the ITO layer was formed, and then forming dot spacers with a height of 7 μm, a diameter of 70 μm and a pitch of 1.5 mm on the ITO layer.

Figure 6:
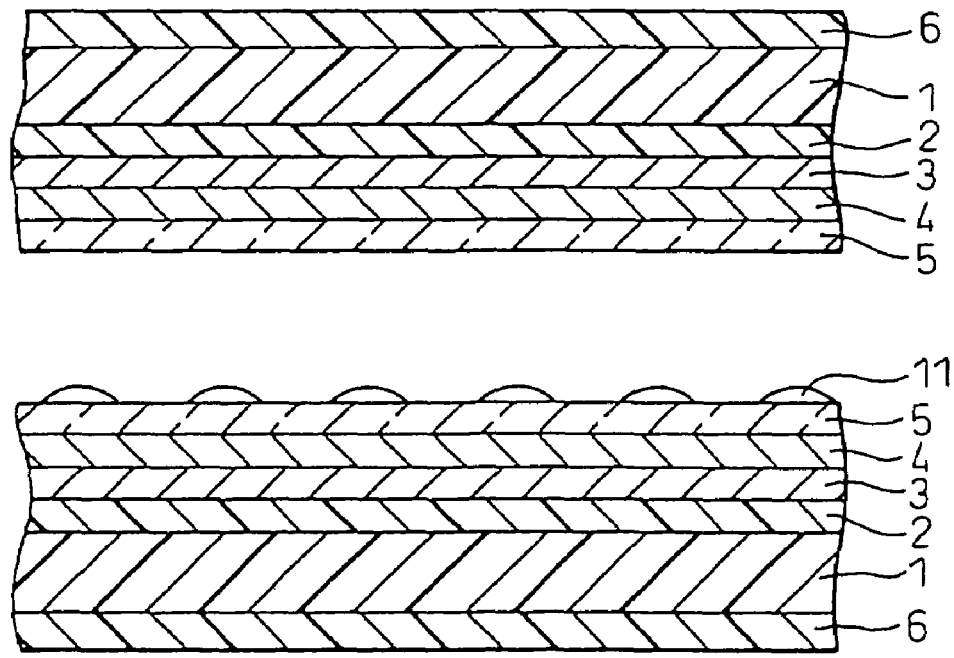

Using the produced movable electrode substrate and the produced fixed electrode substrate, a transparent touch panel shown in FIG. 6 was produced. A writing durability test of reciprocating straight lines 300,000 times under a load of 250 g was performed in the same manner as in Example 1. The test results are shown in Table 1.

Example 4

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle.

A $TiO_2$ fine particle having a primary diameter of 20 nm was mixed in Coating Solution A used in Example 1 to prepare Coating Solution G where the weight ratio of $TiO_2$ fine particle to alkoxysilane was 50:50. Coating Solution G was coated on the silica particle-containing cured resin layer (2) by a bar coating method and baked at 130° C. for 2 minutes to form a high refractive-index layer having a thickness of 40 nm. Subsequently, Coating Solution A used in Example 1 was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer. Furthermore, an ITO layer was formed on the low refractive-index layer in the same manner as in Example 1 to produce a transparent electroconductive laminate for use as a movable electrode substrate. The transparent electroconductive laminate after the ITO layer formation had the total luminous transmittance of 90.8% and a haze value of 2.2%.

Separately, on both surfaces of a 100 μm-thick polycarbonate film (PURE ACE, produced by Teijin Ltd.), a cured resin layer having a thickness of 3 μm was formed using an ultraviolet-curable urethane acrylate resin coating material. The subsequent procedure was performed in the same manner as in the production of the movable electrode substrate above, that is, Coating Solution G was coated on the cured resin layer (2) on one surface by a bar coating method and baked at 130° C. for 2 minutes to form a high refractive-index layer having a thickness of 40 nm, then Coating Solution A used in Example 1 was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer, and furthermore, an ITO layer was formed on the low refractive-index layer to produce a transparent electroconductive laminate. The transparent electroconductive laminate after the ITO layer formation had the total luminous transmittance of 90.5% and a haze value of 2.3%. A 1.1 mm-thick polycarbonate sheet was attached using a pressure-sensitive adhesive to this transparent electroconductive laminate to come into contact with the surface opposite the surface where the ITO layer was formed, and then dot spacers with a height of 7 μm, a diameter of 70 μm and a pitch of 1.5 mm were formed on the ITO layer, whereby a fixed electrode substrate was produced. Using the produced movable electrode substrate and the produced fixed electrode substrate, a transparent touch panel shown in FIG. 6 was produced. A writing durability test of reciprocating straight lines 300,000 times under a load of 250 g was performed in the same manner as in Example 1. The test results are shown in Table 1.

Reference Example

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle. A $TiO_2$ fine particle having a primary diameter of 20 nm was mixed in Coating Solution A used in Example 1 to prepare Coating Solution H where the weight ratio of $TiO_2$ fine particle to alkoxysilane was 90:10. Coating Solution H was coated on the silica particle-containing cured resin layer (2) by a bar coating method and baked at 130° C. for 2 minutes to form a high refractive-index layer having a thickness of 70 nm. Subsequently, Coating Solution A used in Example 1 was coated on the high refractive-index layer by a bar coating method and baked at 130° C. for 2 minutes to form a low refractive-index layer having a thickness of 50 nm, thereby producing an optical interference layer consisting of a high refractive-index layer and a low refractive-index layer. Furthermore, an ITO layer was formed on the low refractive-index layer to produce a transparent electroconductive laminate for use as a movable electrode substrate. The transparent electroconductive laminate after the ITO layer formation had the total luminous transmittance of 9 1.0% and a haze value of 2.7%.

Using the produced movable electrode substrate and a glass fixed electrode substrate with a transparent electroconductive layer produced in the same manner as in Example 1, a transparent touch panel shown in FIG. 5 was produced. A writing durability test of reciprocating straight lines 300,000 times under a load of 250 g was performed in the same manner as in Example 1. The results are shown in Table 1.

Comparative Example 1

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle.

Coating Solution I was prepared by diluting tetrabutoxytitanate ("B-4" produced by Nippon Soda Co., Ltd.) with a mixed solvent of ligroin (produced by Wako Pure Chemical Industries, Ltd., guaranteed grade) and butanol (produced by Wako Pure Chemical Industries, Ltd., guaranteed grade). Subsequently, Coating Solution I was coated on the silica particle-containing cured resin layer by a bar coating method and baked at 130° C. for 2 minutes to form a high refractive-index layer having a thickness of 75 nm. Thereafter, Coating Solution A used in Example 1 was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer in the same manner as in Example 1 to produce a transparent electroconductive laminate for use as a movable electrode substrate. The transparent electroconductive laminate after the ITO layer formation had the total luminous transmittance of 89.5% and a haze value of 2.7%.

Using the produced movable electrode substrate and a glass fixed electrode substrate with a transparent electroconductive layer produced in the same manner as in Example 1, a transparent touch panel shown in FIG. 5 was produced. A writing durability test of reciprocating straight lines 300,000 times under a load of 250 g was performed in the same manner as in Example 1. The results are shown in Table 1.

TABLE 1

|  | Total Luminous Transmittance (%) | Haze (%) | Durability by Writing Reciprocating Straight Lines 300,000 Time Under Load of 250 g |
|---|---|---|---|
| Example 1 | 91.3 | 2.4 | No change in both electric property and appearance. |
| Example 2 | 90.2 | 2.8 | No change in both electric property and appearance. |
| Example 3 | movable electrode: 91.1 fixed electrode: 90.8 | movable electrode: 2.4 fixed electrode: 1.7 | No change in both electric property and appearance. |
| Example 4 | movable electrode: 89.8 fixed electrode: 90.2 | movable electrode: 2.5 fixed electrode: 1.5 | No change in both electric property and appearance. |
| Reference Example | 91.0 | 2.7 | bad electric property and stripping of optical interference layer. |
| Comparative Example 1 | 89.5 | 2.7 | bad electric property and stripping of optical interference layer |

EXAMPLE 5

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle.

Subsequently, in a mixed solution of a metal alkoxide obtained by mixing Coating Solution I and Coating Solution A used in Example 1 to have a Coating Solution I content of 80%, a ZnO fine particle having a primary diameter of 20 nm was mixed to prepare Coating Solution J where the weight ratio of ZnO fine particles to metal alkoxide was 20:80. Coating Solution J was coated on the silica particle-containing cured resin layer (2) by a bar coating method and baked at 130° C. for 2 minutes to form a high refractive-index layer having a thickness of 70 nm. Thereafter, Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer by a sputtering method using an indium-tin oxide target having a composition of indium oxide and tin oxide in a weight ratio of 9:1 and having a packing density of 98%, to produce a transparent electroconductive laminate for use as a movable electrode substrate. The thickness of the ITO layer formed was about 20 nm and the surface resistance was about 280Ω/□. The transparent electroconductive laminate after the ITO layer formation had the total luminous transmittance of 93.0% and a haze value of 2.5%.

Using the movable electrode substrate and a fixed electrode substrate with a transparent electroconductive layer produced in the same manner as in Example 1, a transparent touch panel shown in FIG. 5 was produced. A writing durability test of reciprocating straight lines 450,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed. The results are shown in Table 2.

EXAMPLE 6

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein silica particles.

Subsequently, $TiO_2$ fine particles having a primary diameter of 20 nm was mixed in Coating Solution I used in Comparative Example 1 to prepare Coating Solution K where the weight ratio of $TiO_2$ fine particles to metal alkoxide was 25:75. Coating Solution K was coated on the silica particle-containing cured resin layer (2) by a bar coating method and baked at 130° C. for 2 minutes to form a high refractive-index layer having a thickness of 40 nm. Thereafter, Coating Solution A was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer. Furthermore, an ITO layer was formed on the low refractive-index layer in the same manner as in Example 5 to produce a transparent electroconductive laminate for use as a movable electrode substrate. The transparent electroconductive laminate after the ITO layer formation had the total luminous transmittance of 93.1% and a haze value of 2.4%.

Separately, on both surfaces of a 75 μm-thick polyethylene terephthalate film (OFW, produced by Teijin DuPont Films Japan Limited), a cured resin layer having a thickness of 3 μm was formed using an ultraviolet-curable urethane acrylate resin coating material. The subsequent procedure was performed in the same manner as in the production of the movable electrode substrate above, that is, Coating Solution K was coated on the cured resin layer on one surface by a bar coating method and baked at 130° C. for 2 minutes to form a high refractive-index layer having a thickness of 40 nm, then Coating Solution A was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer, and furthermore, an ITO layer was formed on the low refractive-index layer in the same manner as in Example 5 to produce a transparent electroconductive laminate. The transparent electroconductive laminate after the ITO layer formation had the total luminous transmittance of 92.8% and a haze value of 1.7%. A 1.1 mm-thick polycarbonate sheet was attached using a pressure-sensitive adhesive to this transparent electroconductive laminate to come into contact with the surface opposite the surface where the ITO layer was formed, and then dot spacers with a height of 7 μm, a diameter of 70 μm and a pitch of 1.5 mm were formed on the ITO layer, whereby a fixed electrode substrate was produced.

Using the produced movable electrode substrate and fixed electrode substrate, a transparent touch panel shown in FIG. 6 was produced. The durability in writing reciprocating straight lines 450,000 times under a load of 250 g was examined in the same manner as in Example 5. The test results are shown in Table 2.

EXAMPLE 7

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle.

Subsequently, in a mixed solution of a metal alkoxide obtained by mixing Coating Solution I used in Comparative Example 1 and Coating Solution A to have a Coating Solution I content of 90%, a TiO$_2$ fine particle having a primary diameter of 20 nm was mixed to prepare Coating Solution L where the weight ratio of TiO$_2$ fine particle to metal alkoxide was 15:85. Coating Solution L was coated on the silica particle-containing cured resin layer (2) by a bar coating method and baked at 130° C. for 2 minutes to form a high refractive-index layer having a thickness of 40 nm. Thereafter, Coating Solution A was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer. Furthermore, an ITO layer was formed on the low refractive-index layer in the same manner as in Example 5 to produce a transparent electroconductive laminate for use as a movable electrode substrate. The transparent electroconductive laminate after the ITO layer formation had the total luminous transmittance of 93.4% and a haze value of 2.8%.

Separately, on both surfaces of a 1.0 mm-thick polycarbonate sheet (PANLIGHT, produced by Teijin Chemicals Ltd.), a cured resin layer having a thickness of 3 μm was formed using an ultraviolet-curable urethane acrylate resin coating material. Coating Solution L was coated on the cured resin layer on one surface by a spin coating method and baked at 130° C. for 2 minutes to form a high refractive-index layer having a thickness of 40 nm.

Subsequently, Coating Solution A was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer. Furthermore, an ITO layer was formed on the low refractive-index layer in the same manner as in Example 5 to produce a transparent electroconductive laminate. The transparent electroconductive laminate after the ITO layer formation had the total luminous transmittance of 94.0% and a haze value of 1.8%. On the ITO layer, dot spacers with a height of 7 μm, a diameter of 70 μm and a pitch of 1.5 mm were formed, whereby a fixed electrode substrate was produced.

Using the produced movable electrode substrate and the produced fixed electrode substrate, a transparent touch panel shown in FIG. 6 was produced. The durability in writing reciprocating straight lines 450,000 times under a load of 250 g was examined in the same manner as in Example 5. The test results are shown in Table 2.

TABLE 2

|  | Total Luminous Transmittance (%) | Haze (%) | Durability by Writing Reciprocating Straight Lines 300,000 Time Under Load of 250 g |
| --- | --- | --- | --- |
| Example 5 | 93.0 | 2.5 | No change in both electric property and appearance. |
| Example 6 | movable electrode: 93.1 fixed electrode: 92.8 | movable electrode: 2.4 fixed electrode: 1.7 | No change in both electric property and appearance. |
| Example 7 | movable electrode: 93.4 fixed electrode: 94.0 | movable electrode: 2.8 fixed electrode: 1.8 | No change in both electric property and appearance. |

EXAMPLE 8

On both surfaces of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

Thereafter, a silica fine particle having an average primary diameter of 0.5 μm was mixed in Coating Solution I to a ratio of 0.3 parts by weight per 100 parts by weight of tetrabutoxytitanate to prepare Coating Solution M.

Coating Solution M was coated on the cured resin layer (1) by a bar coating method and baked at 130° C. for 2 minutes to form a high refractive-index layer having a thickness of 50 nm. Subsequently, Alkoxysilane Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer.

Furthermore, an ITO layer was formed on the low refractive-index layer in the same manner as in Example 1 to produce a transparent electroconductive laminate for use as a movable electrode substrate. The thickness of the formed ITO layer was about 20 nm and the surface resistance was about 280Ω/□. The transparent electroconductive laminate after the ITO layer formation had the total luminous transmittance of 91.7% and a haze value of 1.4%.

Using a fixed electrode substrate with a transparent electroconductive layer produced in the same manner as in Example 5 and the movable electrode substrate, a transparent touch panel shown in FIG. 5 was produced. A durability test of writing reciprocating straight lines 300,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed.

In order to confirm a sticking phenomenon between transparent electroconductive layers of the movable electrode substrate and the fixed electrode substrate, the transparent touch panel was touched under an arbitrary pressure using the above-described pen to put the transparent electroconductive layers of the movable electrode substrate and the fixed electrode substrates into contact with each other and the presence or absence of a sticking phenomenon between transparent electroconductive layers of the movable electrode substrate and the fixed electrode substrates after the pen was moved was examined. Furthermore, the transparent touch panel was disposed on a high resolution color liquid crystal display and how the liquid crystal display was viewed through the transparent touch panel was observed. The results are shown in Table 3.

EXAMPLE 9

On both surfaces of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

Thereafter, Coating Solution M and Coating Solution A were mixed at a ratio of 70:30 to prepare Coating Solution N and then, $TiO_2$ fine particles having a primary diameter of 20 nm were mixed in Coating Solution N to prepare Coating Solution O where the weight ratio of $TiO_2$ fine particle and metal alkoxide was 30:70. Coating Solution O was coated on the cured resin layer (1) by a bar coating method and baked at 130° C. for 2 minutes to form a high refractive-index layer having a thickness of 55 nm. Subsequently, Coating Solution A used in Example 1 was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer. Furthermore, an ITO layer was formed on the low refractive-index layer in the same manner as in Example 1 to produce a transparent electroconductive laminate for use as a movable electrode substrate. The transparent electroconductive laminate after the ITO layer formation had the total luminous transmittance of 90.1% and a haze value of 2.1%.

Separately, on both surfaces of a 75 μm-thick polyethylene terephthalate film (OFW, produced by Teijin DuPont Films Japan Limited), a cured resin layer 1 having a thickness of 3 μm was formed using an ultraviolet-curable urethane acrylate resin coating material. The subsequent procedure was performed in the same manner as in the production of the movable electrode substrate above, that is, Coating Solution L was coated on the cured resin layer 1 by a bar coating method and baked at 130° C. for 2 minutes to form a high refractive-index layer having a thickness of 55 nm, then Coating Solution A was coated on the high refractive-index layer by a bar coating method and baked at 130° C. for 2 minutes to form a low refractive-index layer having a thickness of 40 nm, thereby producing an optical interference layer consisting of a high refractive-index layer and a low refractive-index layer, and furthermore, an ITO layer was formed on the low refractive-index layer in the same manner as in Example 1 to produce a transparent electroconductive laminate. The transparent electroconductive laminate after the ITO layer formation had the total luminous transmittance of 90.4% and a haze value of 1.9%. A 1.1 mm-thick polycarbonate sheet was attached using a pressure-sensitive adhesive to this transparent electroconductive laminate to come into contact with the surface opposite the surface where the ITO layer was formed, and then dot spacers with a height of 7 μm, a diameter of 70 μm and a pitch of 1.5 mm were formed on the ITO layer, whereby a fixed electrode substrate was produced.

Using the produced movable electrode substrate and the produced fixed electrode substrate, a transparent touch panel shown in FIG. 6 was produced. After a writing durability test was performed in the same manner as in Example 8, the electrical property (linearity) of the transparent touch panel was measured and the appearance of the optical interference layer was observed. Also, the presence or absence of a sticking phenomenon between transparent electroconductive layers of the movable electrode substrate and the fixed electrode substrates was examined. Furthermore, the transparent touch panel was disposed on a high resolution color liquid crystal display and how the liquid crystal display was viewed through the transparent touch panel was observed. The test results are shown in Table 3.

Comparative Example 2

On both surfaces of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

Thereafter, silica fine particles having an average primary diameter of 0.5 μm were mixed in Coating Solution I used in Example 8 to a ratio of 1.0 part by weight per 100 parts by weight of tetrabutoxytitanate to prepare Coating Solution P. Coating Solution P was coated on the cured resin layer (1) by a bar coating method and baked at 130° C. for 2 minutes to form a high refractive-index layer having a thickness of 50 nm. Subsequently, Coating Solution A used in Example 8 was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer. Furthermore, an ITO layer was formed on the low refractive-index layer in the same manner as in Example 8 to produce a transparent electroconductive laminate for use as a movable electrode substrate. The transparent electroconductive laminate after the ITO layer formation had the total luminous transmittance of 91.8% and a haze value of 2.6%. The produced transparent electroconductive laminate was slightly white-colored due to the fine particles added in a large amount.

Using the movable electrode substrate produced above and a fixed electrode substrate produced in the same manner as in Example 8, a transparent touch panel shown in FIG. 5 was produced. The transparent touch panel was disposed on a high resolution color liquid crystal display and how the liquid crystal display was viewed through the transparent touch panel was observed. The liquid crystal display was seen indistinctly due to the fine particles added in a large amount and the visibility was bad.

Comparative Example 3

On both surfaces of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

Thereafter, silica fine particles having a primary particle size of 1.5 μm were mixed in Coating Solution I used in Example 8 to a ratio of 0.3 parts by weight per 100 parts by weight of tetrabutoxytitanate to prepare Coating Solution Q. Coating Solution Q was coated on the cured resin layer (1) by a bar coating method and baked at 130° C. for 2 minutes to form a high refractive-index layer having a thickness of 50 nm. Subsequently, Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer.

Furthermore, an ITO layer was formed on the low refractive-index layer in the same manner as in Example 8 to produce a transparent electroconductive laminate for use as a movable electrode substrate. The transparent electroconductive laminate after the ITO layer formation had the total luminous transmittance of 91.4% and a haze value of 2.3%.

Using the movable electrode substrate produced above and a fixed electrode substrate produced in the same manner as in Example 8, a transparent touch panel shown in FIG. 5 was produced. Then, a writing durability test was performed in the same manner as in Example 8. At the writing durability test, the fine particle fell off from the optical interference layer due to the large primary diameter of the fine particle added to the optical interference layer, as a result, the electric property (linearity) of transparent touch panel and the appearance of optical interference layer were vary bad. Also, the transparent touch panel was disposed on a high resolution color liquid crystal display and how the liquid crystal display could be seen through the transparent touch panel was observed. The liquid crystal display was viewed glaringly due to the large primary diameter of the fine particles added.

TABLE 3

| | Writing Durability | Presence or Absence of Sticking Phenomenon | View of Liquid Crystal Display |
|---|---|---|---|
| Example 8 | No change in both electric property and appearance. | None | Good |
| Example 9 | No change in both electric property and appearance. | None | Good |

EXAMPLE 10

On both surfaces of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material.

Thereafter, Coating Solution M prepared in Example 8 was coated on the cured resin layer (1) by a bar coating method and baked at 130° C. for 2 minutes to form a high refractive-index layer having a thickness of 50 nm.

Subsequently, Coating Solution R was prepared using an ultraviolet-curable resin comprising 31.3 parts by weight of trimethylolpropane triacrylate and 62.6 parts by weight of dimethylolpropane hexaacrylate, a photoinitiator comprising 5.0 parts by weight of 1-hydroxy-cyclohexyl-phenylketone and 1.0 part by weight of benzophenone, and a diluent comprising a mixed solvent of isopropyl alcohol and 1-methoxy-2-propanol.

Coating Solution R was coated on the high refractive-index layer by a bar coating method and dried at 60° C. for 2 minutes and then, the coating film was cured using a high-pressure mercury lamp having an intensity of 160 W/cm under the condition of giving an integrated light quantity of 300 mJ/cm$^2$ to form a low refractive-index layer having a thickness of 45 nm, thereby producing an optical interference layer consisting of a high refractive-index layer and a low refractive-index layer. Furthermore, an ITO layer was formed on the low refractive-index layer in the same manner as in Example 1 to produce a transparent electroconductive laminate for use as a movable electrode substrate. The thickness of the formed ITO layer was about 20 nm and the surface resistance was about 280Ω/□. The transparent electroconductive laminate after the ITO layer formation had the total luminous transmittance of 90.1% and a haze value of 1.4%.

Separately, a fixed electrode substrate with an ITO layer was produced in the same manner as in Example 1. Using the produced fixed electrode substrate and the produced movable electrode substrate, a transparent touch panel shown in FIG. 5 was produced. A writing durability test of reciprocating straight lines 300,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed. In order to confirm a sticking phenomenon between transparent electroconductive layers of the movable electrode substrate and the fixed electrode substrate, the transparent touch panel was touched under an arbitrary pressure using the above-described pen to put the transparent electroconductive layers of the movable electrode substrate and the fixed electrode substrates into contact with each other and the presence or absence of a sticking phenomenon between transparent electroconductive layers of the movable electrode substrate and the fixed electrode substrates after the pen was moved was examined. Furthermore, the transparent touch panel was disposed on a high resolution color liquid crystal display and how the liquid crystal display could be seen through the transparent touch panel was observed. The results are shown in Table 4.

EXAMPLE 11

On one surface of a 188 μm-thick polyethylene terephthalate film (OFW, produced by Teijin DuPont Films Japan Limited), a cured resin layer (1) having a thickness of 3 μm was formed using an ultraviolet-curable urethane acrylate resin coating material. Then, on the opposite surface, a cured resin layer (2) having a thickness of 3 μm was formed using an ultraviolet-curable urethane acrylate resin coating material having mixed therein a silica particle.

Thereafter, Coating Solution L of Example 7 was coated on the silica particle-containing cured resin layer (2) by a bar coating method and baked at 130° C. for 2 minutes to form a high refractive-index layer having a thickness of 55 nm. Subsequently, Coating Solution R used in Example 10 was coated on the high refractive-index layer by a bar coating method and dried at 60° C. for 2 minutes and then, the coating film was cured using a high-pressure mercury lamp having an intensity of 160 W/cm under the condition of giving an integrated light quantity of 300 mJ/cm² to form a low refractive-index layer having a thickness of 45 nm, thereby producing an optical interference layer consisting of a high refractive-index layer and a low refractive-index layer. Furthermore, an ITO layer was formed on the low refractive-index layer by a sputtering method using an indium-tin oxide target having a composition of indium oxide and tin oxide in a weight ratio of 9:1 and having a packing density of 98%, to produce a transparent electroconductive laminate for use as a movable electrode substrate. The thickness of the formed ITO layer was about 20 nm and the surface resistance was about 280Ω/□. The transparent electroconductive laminate after the ITO layer formation had the total luminous transmittance of 90.6% and a haze value of 2.5%.

Separately, a fixed electrode substrate with an ITO layer was produced in the same manner as in Example 1. Using the produced fixed electrode substrate and the produced movable electrode substrate, a transparent touch panel shown in FIG. 5 was produced. A durability test of writing reciprocating straight lines 300,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed. The results are shown in Table 4.

TABLE 4

| | Writing Durability | Presence or Absence of Sticking Phenomenon | View of Liquid Crystal Display |
|---|---|---|---|
| Example 10 | No change in both electric property and appearance. | None | Good |
| Example 11 | No change in both electric property and appearance. | None | Good |

EXAMPLES 12 and 13

FIG. 3 shows a touch panel using the transparent electroconductive laminate of Example 12 or 13. In the FIG. 9 is a glass substrate, 5 and 10 are a transparent electroconductive layer, 11 is a dot spacer, 1 and 8 are a polyethylene terephthalate film, 7 is a transparent elastic layer, 2, 2' and 6 are a cured resin layer, 4 is a low refractive-index layer, and 3 is a high refractive-index layer. The fixed electrode substrate is constituted by the glass substrate 1, the transparent electroconductive layer 10 and the dot spacer, and the movable electrode substrate is constituted by the polyethylene terephthalate films 1 and 8, the transparent elastic layer 7, the cured resin layers 2, 2' and 6, the low refractive-index layer 4, the high refractive-index layer 5 and the transparent electroconductive layer 10.

For producing such a touch panel, an SiO₂ layer was stacked on both surfaces of a 1.1 mm-thick glass substrate 9 by a dip coating method and thereon, an ITO layer having a thickness of 18 nm was stacked as the transparent electroconductive layer 10 by a sputtering method to produce a glass electrode substrate. On the ITO layer, dot spacers 11 with a height of 7 μm, a diameter of 70 μm and a pitch of 1.5 mm were formed to produce a fixed electrode substrate comprising a glass electrode substrate.

Separately, a 75 μm-thick polyethylene terephthalate film (OFW, produced by Teijin DuPont Films Japan Limited) was prepared for use as the organic polymer film 1 and the transparent base material 8.

On one surface of this polyethylene terephthalate film, a coating solution containing 1% of a component comprising an oligomer produced by the hydrolysis of γ-aminopropyltriethoxysilane was coated and dried at 130° C. for 5 minutes, thereby performing a primer treatment. Subsequently, a transparent elastic layer 7 having a thickness of 30 μm was stacked on the primer-treated surface using Coating Solution Y containing a silicone resin component comprising polydimethylsiloxane. The Young's modulus of the transparent elastic layer 7 was $1.4 \times 10^8$ Pa. Incidentally, the Young's modulus of a polyethylene terephthalate film without the coated layer measured in the same manner was $5.4 \times 10^9$ Pa. On the transparent elastic layer 7, a primer-treated surface of another polyethylene terephthalate film was attached to produce a laminate R comprising a polyethylene terephthalate film, a transparent elastic layer and a polyethylene terephthalate film.

Thereafter, a cured resin layer 2 or 6 having a thickness of 3 μm was stacked on both surfaces of the laminate R using an ultraviolet-curable urethane acrylate resin coating material to produce a laminate S comprising a cured resin layer 2, a polyethylene terephthalate film 1, a transparent elastic layer 7, a polyethylene terephthalate film 8 and a cured resin layer 6.

Coating Solution M prepared in Example 8 was coated on the surface of the cured resin layer 2 by a bar coating method and baked at 130° C. for 2 minutes to form a high refractive-index layer having a thickness of 50 nm.

Then, Alkoxysilane Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer.

Furthermore, an ITO layer was formed on the low refractive-index layer in the same manner as in Example 1 to produce a transparent electroconductive laminate of Example 12 for use as a movable electrode substrate. The thickness of the ITO layer formed was about 20 nm and the surface resistance was about 280Ω/□. The transparent electroconductive laminate after the ITO layer formation had the total luminous transmittance of 91.0% and a haze value of 1.7%.

On the other hand, for producing a transparent electroconductive laminate of Example 13, a cured resin layer 6 having a thickness of 3 μm was stacked on one surface of the laminate R using an ultraviolet-curable urethane acrylate resin coating material. Then, on the opposite layer, a cured resin layer 2 having a thickness of 3 μm was stacked using an ultraviolet-curable urethane acrylate resin coating material having mixed therein a silica particle, to produce a laminate T comprising a cured resin layer 6, a polyethylene terephthalate film 8, a transparent elastic layer 7, a polyethylene terephthalate film 1 and a cured resin layer 2'.

Coating Solution L prepared in Example 7 was coated on the surface of the cured resin layer 2' by a bar coating method and baked at 130° C. for 2 minutes to form a high refractive-index layer having a thickness of 50 nm.

Then, Alkoxysilane Coating Solution A was coated on the high refractive-index layer by a bar coating method and baked at 130° C. for 2 minutes to form a low refractive-index layer having a thickness of 45 nm, thereby producing an optical interference layer consisting of a high refractive-index layer and a low refractive-index layer.

Furthermore, an ITO layer was formed on the low refractive-index layer in the same manner as in Example 1 to produce a transparent electroconductive laminate of Example 13 for use as a movable electrode substrate. The thickness of the ITO layer formed was about 20 nm and the surface resistance was about 280 Ω/□. The transparent electroconductive laminate after the ITO layer formation had the total luminous transmittance of 90.7% and a haze value of 2.8%.

Using the produced fixed electrode substrate and the produced movable electrode substrate, a transparent touch panel shown in FIG. 3 was produced. A writing durability test of reciprocating straight lines 300,000 times under a load of 250 g was performed using a polyacetal-made pen having a tip of 0.8R from the movable electrode side of the produced transparent touch panel. After the writing durability test, the electrical property (linearity) of the transparent touch panel was measured and the appearance of the optical interference layer was observed.

The results are shown in Table 5.

TABLE 5

| Example | Total Luminous Transmittance (%) | Haze (%) | Durability by Writing Reciprocating Straight Lines 300,000 Time Under Load of 250 g |
|---|---|---|---|
| 12 | 90.6 | 2.5 | No change in both electric property and appearance. |
| 13 | 90.7 | 2.8 | No change in both electric property and appearance. |

INDUSTRIAL APPLICABILITY

According to the present invention, a crosslinked polymer layer of alkoxysilane containing an ultrafine particle comprising a metal oxide and/or a metal fluoride and having a primary diameter of 100 nm or less is used as the optical interference layer and the weight ratio of the ultrafine particle to alkoxysilane is set to a specific ratio, whereby a low-cost transparent electroconductive laminate, having excellent transparency and capable of ensuring high reliability in the writing durability and the like required of the transparent touch panel, is provided. Also, according to the present invention, in the optical interference layer comprising a low refractive-index layer and a high refractive-index layer, a crosslinked polymer layer of alkoxysilane is used as the low refractive-index layer and a crosslinked polymer layer of metal alkoxide mainly other than alkoxysilane is used as the high refractive-index layer and an ultrafine particle comprising a metal oxide and having a primary diameter of 100 nm or less is contained in the high refractive-index layer at a specific ratio, whereby a low-cost transparent electroconductive laminate, having excellent transparency and capable of ensuring high reliability in the writing durability and the like required of the transparent touch panel is provided. Furthermore, according to the present invention, a transparent electroconductive laminate having excellent writing durability free of change in the electric property and appearance, causing no sticking phenomenon, giving good liquid crystal display and being suitable for a touch panel can be provided.

The invention claim is:

1. A transparent electroconductive laminate comprising an organic polymer film having stacked thereon a transparent electroconductive layer, wherein:

an optical interference layer and a transparent electroconductive layer are sequentially stacked on at least one surface of the organic polymer film, the optical interference layer comprises a high refractive-index layer and a low refractive-index layer, with the low refractive-index layer being in contact with the transparent electroconductive layer, the high refractive-index layer and the low refractive-index layer each is composed of a crosslinked polymer, at least either one of the high refractive-index layer and the low refractive-index layer containing metal oxide and/or metal fluoride ultrafine particles having a primary diameter of 100 nm or less, the low refractive-index layer has a refractive index of 1.6 or less, the high refractive-index layer has a larger refractive index than the low refractive-index layer, and the crosslinked polymer of at least one of the high refractive-index layer and the low refractive-index layer is one formed by hydrolysis and condensation polymerization of a metal alkoxide.

2. The transparent electroconductive laminate as claimed in claim 1, wherein said metal oxide and/or metal fluoride is at least one member selected from the group consisting of $Al_2O_3$, $Bi_2O_3$, $CeO_2$, $In_2O_3$, $In_2O_3$, $SnO_2$, $HfO_2$, $La_2O_3$, $MgF_2$, $Sb_2O_5$, $Sb_2O_5$, $SnO_2$, $SiO_2$, $SnO_2$, $TiO_2$, $Y_2O_3$, $ZnO$ and $ZrO_2$.

3. The transparent electroconductive laminate as claimed in claim 1, wherein the weight ratio of said ultrafine particles to said metal alkoxide is from 5:95 to 80:20.

4. The transparent electroconductive laminate as claimed in claim 3, wherein said high refractive-index layer is one formed by hydrolysis and condensation polymerization of a mixture comprising said ultrafine particles and alkoxysilane at a weight ratio of 5:95 to 80:20.

5. The transparent electroconductive laminate as claimed in claim 1, wherein said high refractive-index layer is one formed by hydrolysis and condensation polymerization of a mixture comprising said ultrafine particles and a metal alkoxide at a weight ratio of 1:99 to 60:40 and said metal alkoxide is mainly comprised of a metal alkoxide other than alkoxysilane.

6. The transparent electroconductive laminate as claimed in claim 1, wherein said high refractive-index layer is composed of a mixture comprising said ultrafine particles and said thermosetting resin or radiation-curable resin at a weight ratio of 5:95 to 80:20.

7. The transparent electroconductive laminate as claimed in claim 1, wherein said crosslinked polymer of at least one of the high refractive-index layer and the low refractive-index layer is a thermosetting resin or a radiation-curable resin.

8. The transparent electroconductive laminate as claimed in claim 1, wherein the difference in the refractive index between the high refractive-index layer and the low refractive-index layer is 0.2 or more.

9. The transparent electroconductive laminate as claimed in claim 1, wherein at least one of said high refractive-index layer and said low refractive-index layer contains second fine particles having an average primary diameter of 1.1 times or more the thickness of said optical interference layer and an average primary diameter of 1.2 μm or less, and the content of said second fine particles is 0.5 wt % or less of the crosslinked polymer component constituting the high refractive-index layer and/or low refractiveindex layer containing said second fine particles.

10. The transparent electroconductive laminate as claimed in claim 1, which comprises a cured resin layer between said organic polymer film and said optical interference layer.

11. The transparent electroconductive laminate as claimed in claim 10, wherein said cured resin layer is composed of a thermosetting or radiation-curable resin and has a thickness of 2 to 5 μm.

12. The transparent electro conductive laminate as claimed in claim 10, wherein said cured resin layer contains third fine particles.

13. The transparent electroconductive laminate as claimed in claim 12, wherein said high refractive-index layer is one formed by hydrolysis and condensation polymerization of a mixture comprising said ultrafine particles and a metal alkoxide, said metal alkoxide is mainly comprised of a metal alkoxide other than alkoxysilane, said low refractive-index layer is one formed by hydrolysis and condensation polymerization of alkoxysilane, said ultrafine particle is $TiO_2$, and said third fine particles are silica particles.

14. The transparent electroconductive laminate as claimed in claim 1, wherein a transparent substrate is stacked on the surface of said organic polymer film opposite said optical interference layer, through a transparent elastic layer having a Young's modulus smaller than that of said organic polymer film.

15. A transparent touch panel comprising two transparent electrode substrates each having on at least one surface thereof a transparent electroconductive layer, the two transparent electrode substrates being disposed such that the transparent electroconductive layers face each other, wherein at least one transparent electrode substrate is the transparent electro conductive laminate claimed in claim 1.

16. The transparent touch panel as claimed in claim 15, wherein a movable electrode substrate and a fixed electrode substrate both are said transparent electroconductive laminate.

17. The transparent electroconductive laminate according to claim 1, wherein the transparent electroconductive laminate has a haze of 2.8 or less.

18. A transparent electroconductive laminate comprising an organic polymer film having stacked thereon a transparent electroconductive layer, wherein
an optical interference layer and a transparent electroconductive layer are sequentially stacked on at least one surface of the organic polymer film,
the optical interference layer comprises a high refractive-index layer and a low refractive-index layer, with said low refractive-index layer being in contact with the transparent electroconductive layer,
said optical interference layer is composed of a crosslinked polymer,
at least one of said high refractive-index layer and said low refractive-index layer contains fine particles B having an average primary diameter of 1.1 times or more the thickness of the optical interference layer and an average primary diameter of 1.2 μm or less,
the content of said fine particle B is 0.5 wt % or less of the crosslinked polymer constituting the high refractive-index layer and/or low refractive-index layer containing said fine particle B,
the low refractive-index layer has a refractive index of 1.6 or less,
the high refractive-index layer has a larger refractive index than the low refractive-index layer, and
the crosslinked polymer is a polymer formed by hydrolysis and condensation polymerization of a metal alkoxide or is a thermosetting or radiation-curable resin.

19. The transparent electroconductive laminate as claimed in claim 18, wherein at least one of the high refractive-index layer and the low refractive-index layer contains ultrafine particles A having an average primary diameter of 100 nm or less at a weight ratio (ultrafine particle A):(crosslinked polymer) of 0:100 to 80:20.

20. The transparent electroconductive laminate as claimed in claim 19, wherein said high refractive-index layer is composed of a mixture comprising said ultrafine particles A and said thermosetting or radiation-curable resin at a weight ratio of 5:95 to 80:20.

21. The transparent electroconductive laminate as claimed in claim 18, which comprises a cured resin layer between said organic polymer film and said optical interference layer.

22. The transparent electroconductive laminate as claimed in claim 21, wherein said cured resin layer is composed of a thermosetting or radiation-curable resin and has a thickness of 2 to 5 μm.

23. The transparent electroconductive laminate as claimed in claim 21, wherein said cured resin layer does not contain a fine particle larger than the thickness of said cured resin layer.

24. The transparent electroconductive laminate as claimed in claim 18, wherein said high refractive-index layer is one formed by hydrolysis and condensation polymerization of a mixture comprising said fine particles B and a metal alkoxide, said metal alkoxide is mainly comprised of a metal alkoxide other than alkoxysilane, the low refractive-index layer is one formed by hydrolysis and condensation polymerization of alkoxysilane, and said fine particles B are silica.

25. The transparent electroconductive laminate as claimed in claim 18, wherein a transparent substrate is stacked on the surface of said organic film layer opposite said optical interference layer, through a transparent elastic layer having a Young's modulus smaller than that of said organic polymer film.

* * * * *